(12) United States Patent
    Chen

(10) Patent No.: US 12,607,916 B2
(45) Date of Patent: Apr. 21, 2026

(54) LIGHT SOURCE MODULE AND PROJECTION DEVICE

(71) Applicant: Coretronic Corporation, Hsin-Chu (TW)

(72) Inventor: Fa-Chih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 389 days.

(21) Appl. No.: 18/384,896

(22) Filed: Oct. 30, 2023

(65) Prior Publication Data

US 2024/0142862 A1     May 2, 2024

(30) Foreign Application Priority Data

Oct. 31, 2022    (CN) ........................ 202211344553.X

(51) Int. Cl.
    *G03B 21/14*      (2006.01)
    *G03B 5/02*       (2021.01)
    *G03B 21/16*      (2006.01)
    *G03B 33/08*      (2006.01)

(52) U.S. Cl.
    CPC ............. *G03B 21/142* (2013.01); *G03B 5/02* (2013.01); *G03B 21/16* (2013.01); *G03B 33/08* (2013.01)

(58) Field of Classification Search
    CPC ........ G03B 21/142; G03B 5/02; G03B 21/16; G03B 33/08; G03B 21/204; G03B 21/20; G03B 21/2066
    USPC ..................................................... 353/101, 38
    See application file for complete search history.

(56) References Cited

U.S. PATENT DOCUMENTS

| | | | |
|---|---|---|---|
| 2017/0099467 A1 | 4/2017 | Egawa | |
| 2019/0011100 A1* | 1/2019 | Son | ............................ F21K 9/69 |
| 2019/0238803 A1* | 8/2019 | Tsai | ..................... G03B 21/2013 |
| 2020/0073218 A1* | 3/2020 | Yamamoto | ........... G03B 21/204 |
| 2020/0228765 A1* | 7/2020 | Chen | ..................... H04N 9/3161 |

FOREIGN PATENT DOCUMENTS

| | | |
|---|---|---|
| CN | 105045024 B | 8/2017 |
| CN | 207396956 U | 5/2018 |
| CN | 208351234 U | 1/2019 |
| CN | 111830770 A | 10/2020 |

* cited by examiner

*Primary Examiner* — Magda Cruz

(57)     ABSTRACT

A light source module includes a light source device, a wavelength conversion element, a light refractive element and a driving element. The light source device provides a beam. The wavelength conversion element includes a substrate and first and second optical layers arranged on the substrate. The light refractive element is arranged between the light source device and the wavelength conversion element and located on a transmission path of the beam. The light refractive element has first and second portions, which refract the beam to the first optical layer and to the second optical layer, respectively. The driving element is connected to the light refractive element and drives the light refractive element to move or rotate, so that the first portion and the second portion take turn to enter the transmission path of the beam. The disclosure also provides a projection device having the aforementioned light source module described above.

26 Claims, 15 Drawing Sheets

100b

100b

100c

100e

100e

100j

100j

100k

LIGHT SOURCE MODULE AND PROJECTION DEVICE

CROSS-REFERENCE TO RELATED APPLICATION

This application claims the priority benefit of China application (202211344553.X), filed on Oct. 31, 2022. The entirety of the above-mentioned patent application is hereby incorporated by reference herein and made a part of this specification.

TECHNICAL FIELD

The disclosure relates to a light source module, and more particularly to a light source module for a projection device and a projection device having the aforementioned light source module.

BACKGROUND

The types of light sources used in a projection device have evolved from ultra high pressure mercury lamps (UHP lamps), light emitting diodes (LEDs) to laser diode (LD) light sources in accordance with market requirements for brightness, color saturation, service life, non-toxic and environmental protection of projection devices.

The conventional wavelength conversion element can be arranged on the transmission path of the beam of the light source device and generally includes a circular substrate and a plurality of wavelength conversion layers. In general, the wavelength conversion layers can have different conversion wavelengths, and the circular substrate can be driven and rotated by a motor to allow beams to take turns to enter the wavelength conversion layers. In this way, the wavelength conversion element can convert the beam (e.g., a blue beam) into other colored light (e.g., a yellow beam and a green beam) required to form a projection image.

However, in order for the beam to be able to rotate on the circular substrate and incident on each wavelength conversion layer in turn, each wavelength conversion layer must be arranged in an annular shape throughout the circle on the circular substrate. Therefore, the conventional wavelength conversion element often is provided with excessive wavelength conversion materials, resulting in difficulty in reducing costs.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

The disclosure provides a light source module with the advantage of low cost.

The disclosure provides a projection device with the advantage of low cost.

Other advantages and objectives of the disclosure may be further illustrated by the technical features broadly embodied and described as follows.

In order to achieve one or a portion of or all of the objectives or other objectives, the light source module provided by the disclosure includes a light source device, a wavelength conversion element, a light refractive element and a driving element. The light source device is configured to provide a beam. The wavelength conversion element includes a substrate, a first optical layer and a second optical layer. The first optical layer and the second optical layer are arranged on the substrate. The light refractive element is arranged between the light source device and the wavelength conversion element and is located on a transmission path of the beam. The light refractive element has a first portion and a second portion. The first portion is configured to refract the beam to the first optical layer, and the second portion is configured to refract the beam to the second optical layer. The driving element is connected to the light refractive element and is configured to drive the light refractive element to move or rotate, so that the first portion and the second portion take turn to enter the transmission path of the beam.

In order to achieve one or a portion of or all of the objectives or other objectives, the projection device provided by the disclosure includes an illumination system, a light valve and a projection lens. The illumination system is configured to provide an illumination beam. The light valve is arranged on a transmission path of the illumination beam to convert the illumination beam into an image beam. The projection lens is arranged on a transmission path of the image beam to project the image beam out of the projection device. The illumination system includes the aforementioned light source module. At least one of the first optical layer and the second optical layer of the wavelength conversion element is configured to convert the beam into a converted beam, and the illumination beam includes the converted beam.

The light source module of the disclosure adopts a light refractive element, and the light refractive element has a first portion and a second portion that can make the beam have different light refractive paths. Further, the light source module of the disclosure uses a driving element to drive the light refractive element to rotate or move, so that the first and second portions can take turn to enter the transmission path of the beam, thereby allowing the beam to take turn to enter the first and second optical layers through the light refractive element. Based on the above, the area of the first optical layer and the area of the second optical layer can be designed to match the spot size of the incident beam, thereby effectively reducing the area of the first and second optical layers. Therefore, the light source module of the disclosure can have the advantage of low cost. The projection device of the disclosure adopts the aforementioned light source module, so it can have the advantage of low cost.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
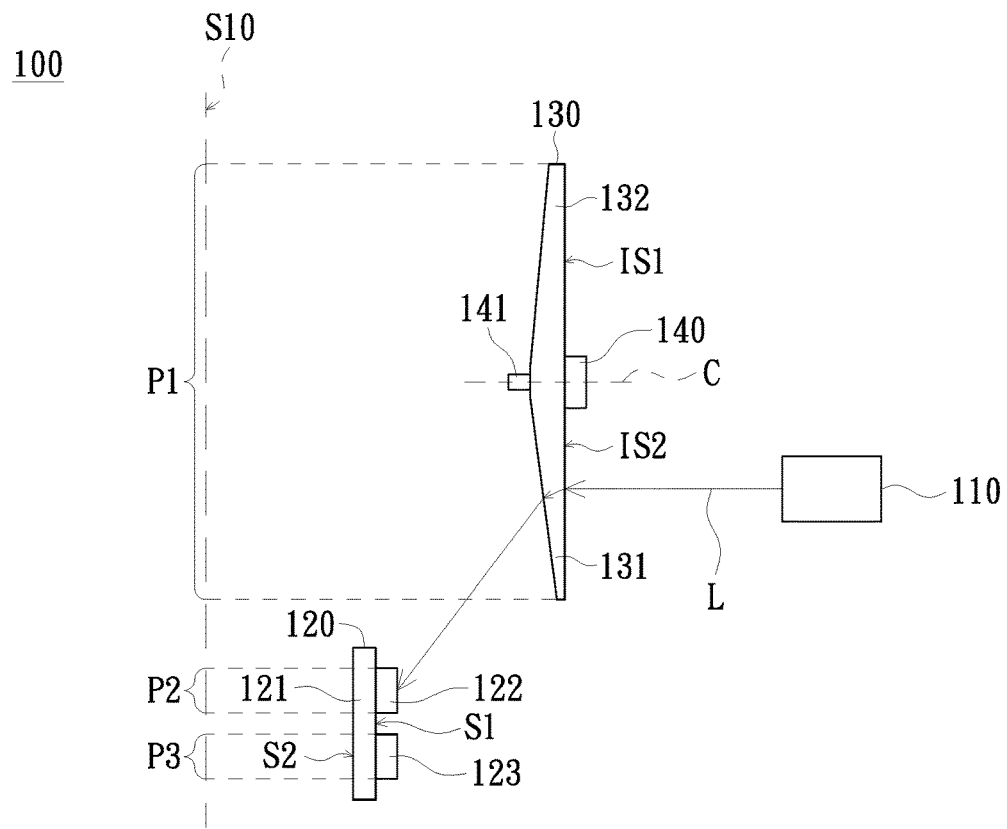
FIG. 1 is a schematic diagram of a light source module according to an embodiment of the disclosure.
Figure 2:
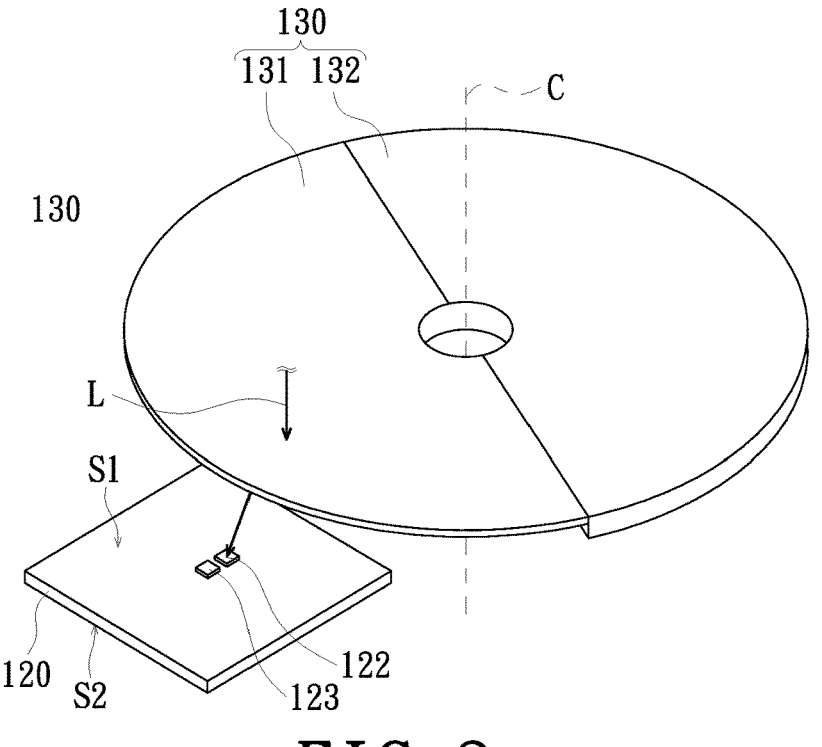
FIG. 2 is a schematic diagram in which a light refractive element in FIG. 1 refracts a beam.
Figure 3:
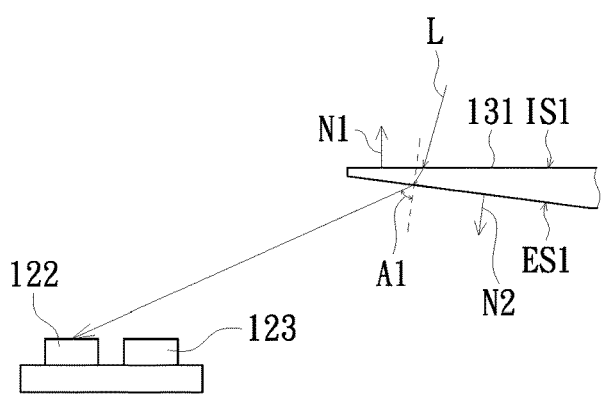
FIG. 3 is a schematic diagram in which a first portion of the light refractive element in FIG. 2 refracts a beam.
Figure 4:
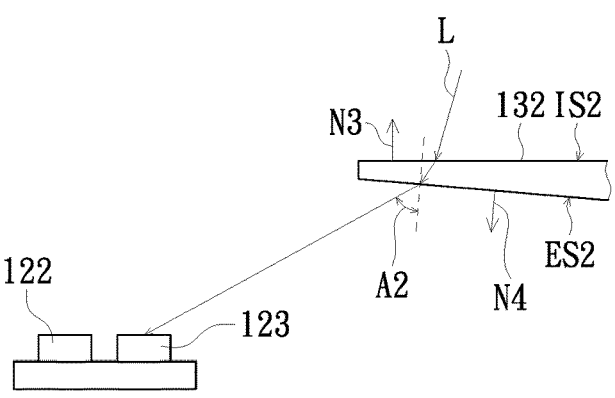
FIG. 4 is a schematic diagram in which a second portion of the light refractive element in FIG. 2 refracts a beam.

FIG. 1 is a schematic diagram of a light source module according to an embodiment of the disclosure. FIG. 2 is a schematic diagram in which a light refractive element in FIG. 1 refracts a beam. FIG. 3 is a schematic diagram in which a first portion of the light refractive element in FIG. 2 refracts a beam. FIG. 4 is a schematic diagram in which a second portion of the light refractive element in FIG. 2 refracts a beam. Please refer to FIGS. 1 and 2 first. The light source module 100 includes a light source device 110, a wavelength conversion element 120, a light refractive element 130 and a driving element 140. The light source device 110 is configured to provide a beam L. The wavelength conversion element 120 includes a substrate 121, a first optical layer 122 and a second optical layer 123. The first optical layer 122 and the second optical layer 123 are arranged on the substrate 121. The light refractive element 130 is arranged between the light source device 110 and the wavelength conversion element 120 and is located on the transmission path of the beam L. The light refractive element 130 has a first portion 131 and a second portion 132. Please refer to FIGS. 3 and 4 first. The first portion 131 of the light refractive element 130 is configured to refract the beam L to the first optical layer 122, and the second portion 132 of the light refractive element 130 is configured to refract the beam L to the second optical layer 123. The driving element 140 is connected to the light refractive element 130. The driving element 140 is configured to drive the light refractive element 130 to move or rotate, so that the first portion 131 and the second portion 132 take turn to enter the transmission path of the beam L.

Refer to FIG. 1 again. The light source device 110 includes, for example, a light emitting diode (LED) or/and a laser diode (LD). The quantity of the light emitting diodes or laser diodes may be one or plural. For example, the light emitting diodes (or laser diodes) can be arranged into a matrix when the quantity of the light emitting diodes (or laser diodes) is plural. In this embodiment, the light source device 110 includes, for example, a laser diode (LD), and the beam L provided by the laser diode (LD) can be, for example, a blue laser, but other embodiments are not limited thereto.

Refer to FIGS. 1 and 2 again. The wavelength conversion element 120 of this embodiment is, for example, a non-moving component. In other words, the beam L can take turn to enter the first optical layer 122 and the second optical layer 123 when the wavelength conversion element 120 is at rest. In this embodiment, the first optical layer 122 may be, for example, a wavelength conversion layer, and the second optical layer 123 may be another wavelength conversion layer. In other words, the first optical layer 122 and the second optical layer 123 can generate a converted beam with a wavelength different from that of the beam L after being irradiated by the beam L. For example, the first optical layer 122 can emit yellow light after being irradiated by the beam L (e.g., a blue laser), and the second optical layer 123 can emit green light after being irradiated by the beam L (e.g., a blue laser). In addition, the aforementioned wavelength conversion layer may include wavelength conversion materials, and the wavelength conversion materials include, for example, fluorescent materials, phosphorous materials (e.g., phosphors), or nano materials (e.g., quantum dots), but the disclosure is not limited thereto. In another embodiment, the first optical layer 122 may be a wavelength conversion layer, and the second optical layer 123 may be a reflective layer. In this case, the first optical layer 122 can emit yellow light after being irradiated by the beam L, and the second optical layer 123 (reflective layer) can directly reflect the beam L.

Figure 5:
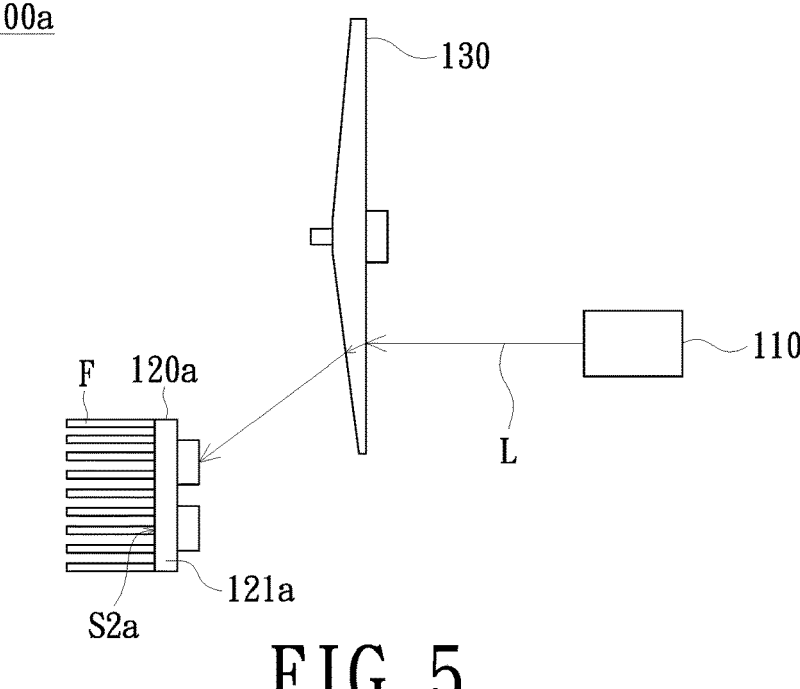
FIG. 5 is a schematic diagram of a light source module according to another embodiment of the disclosure.

In this embodiment, the material of the substrate 121 of the wavelength conversion element 120 may include metal. The aforementioned metal is, for example, aluminum, copper, or silver. In one embodiment, the material of the substrate 121 may include other materials that are resistant to high temperatures and have a higher thermal conductivity, and the material is, for example, ceramic, but the disclosure is not limited thereto. In addition, in this embodiment, the substrate 121 may have a first surface S1 and a second surface S2 opposite to each other. The second surface S2 is, for example, farther away from the light refractive element 130 than the first surface S1. The first optical layer 122 and the second optical layer 123 are arranged on the first surface S1. The second surface S2 can be connected to a heat dissipation device (not shown) to further enhance the heat dissipation efficiency of the substrate 121. Further, the heat dissipation device may include a liquid cooling system, an air cooling system, or a heat conductive material with a high thermal conductivity, but the disclosure is not limited thereto. In one embodiment such as the light source module 100a shown in FIG. 5, the second surface S2a of the substrate 121a of the wavelength conversion element 120a can be provided with a plurality of heat dissipation fins F. In addition, because the wavelength conversion element 120 is a non-moving component, a heat dissipation device with a larger size (e.g., a heat dissipation fin with a larger size) or a substrate with a larger area can be provided, thereby enabling the wavelength conversion element 120 to have a better heat dissipation effect.

Refer to FIGS. 1 and 2 again. The material of the light refractive element 130 may include a light transmitting material, and the material of the light refractive element 130 in this embodiment is, for example, glass, but the disclosure is not limited thereto. Referring to FIGS. 3 and 4 together, the first portion 131 of this embodiment may have a first light incoming surface IS1 and a first light outgoing surface ES1. The first light incoming surface IS1 is, for example, closer to the light source device 110 (shown in FIG. 1) than the first light outgoing surface ES1. The first light incoming surface IS1 and the first light outgoing surface ES1 are opposite, and the beam L from the light source device 110 (shown in FIG. 1) enters the first portion 131 from the first light incoming surface IS1 and exits the first light outgoing surface ES1 in a refractive manner. The beam L exits the first light outgoing surface ES1 at a first refractive angle A1. The second portion 132 has a second light incoming surface IS2 and a second light outgoing surface ES2. The second light outgoing surface ES2 may be closer to the light source device 110 (shown in FIG. 1) than the second light outgoing surface ES2. The second light incoming surface IS2 and the second light outgoing surface ES2 are opposite, and the beam L from the light source device 110 (shown in FIG. 1) enters the second portion 132 from the second light incoming surface IS2 and exits the second light outgoing surface ES2 in a refractive manner. The beam L exits the second light outgoing surface ES2 at a second refractive angle A2. In this embodiment, the first refractive angle A1 is the included angle between the beam L emitted from the first light outgoing surface ES1 and the normal direction N2 of the first light outgoing surface ES1, and the second refractive angle A2 is the included angle between the beam L emitted from the second light outgoing surface ES2 and the normal direction N4 of the second light outgoing surface ES2. The first refractive angle A1 is different from the second refractive angle A2, but the disclosure is not limited thereto. In short, the first portion 131 and the second portion 132 of the light refractive element 130 can guide the beam L to different locations on the substrate 121 at different times. For example, in this embodiment, the first light incoming surface IS1, the first light outgoing surface ES1, the second light incoming surface IS2 and the second light outgoing surface ES2 each are planar. The slope of the first light outgoing surface ES1 relative to the first light incoming surface IS1 is different from the slope of the second light outgoing surface ES2 relative to the second light incoming surface IS2. Further, the first light incoming surface IS1 and the second light incoming surface IS2 are parallel to each other, for example, and the included angle between the normal direction N1 of the first light incoming surface IS1 and the normal direction N2 of the first light outgoing surface ES1 can be different from the included angle between the normal direction N3 of the second light incoming surface IS2 and the normal direction N4 of the second light outgoing surface ES2, so that the first portion 131 and the second portion 132 can guide the beam L to enter the first optical layer 122 and the second optical layer 123, respectively.

Incidentally, please refer to FIGS. 1 and 2 again. The shape of the light refractive element 130 can be in the shape of a disk, and the light refractive element 130 can have a central axis C. The first portion 131 and the second portion 132 are arranged adjacent to each other around the central axis C of the light refractive element 130. The driving element 140 is configured to drive the light refractive element 130 to rotate so that the beam L from the light source device 110 takes turn to enter the first portion 131 and the second portion 132. In detail, the driving element 140 (shown in FIG. 1) includes, for example, a motor, and the motor may include a rotating shaft 141. The rotating shaft 141 can be connected to the light refractive element 130 along the central axis C. In this embodiment, the first portion 131 is connected to the second portion 132, for example, and the area ratio of the first portion 131 and the second portion 132 to the light refractive element 130 can be set according to actual needs. Therefore, the disclosure does not impose any restrictions on this.

Please continue to refer to FIG. 1. The light refractive element 130 of this embodiment can be parallel to the first surface S1 of the substrate 121 of the wavelength conversion element 120. For example, the first light incoming surface IS1 and the second light incoming surface IS2 may be parallel to the first surface S1. It is to be noted that the reference plane S10 is, for example, a virtual plane parallel to the first surface S1 of the substrate 121. The orthogonal projection of the light refractive element 130 on the reference plane S10 does not overlap the orthogonal projection of the first optical layer 122 and the second optical layer 123 on the reference plane S10. Specifically, the orthogonal projection P1 on the reference plane S10 may not overlap the orthogonal projections P2 and P3 of the first optical layer 122 and the second optical layer 123 on the reference plane S10 during rotation or movement of the light refractive element 130. In this way, it is possible to prevent the light refractive element 130 from affecting the transmission path of the beams emitted from the first optical layer 122 and the second optical layer 123. In other embodiments, the orthogonal projection of the light refractive element 130 on the reference plane S10 may partially overlap the orthogonal projection of the first optical layer 122 or the second optical layer 123 on the reference plane S10, as long as it is possible to avoid the light refractive element 130 affecting or blocking the transmission path of the beams emitted from the first optical layer 122 and the second optical layer 123.

Compared with the conventional technology, the light source module 100 of this embodiment employs a light refractive element 130, and the light refractive element 130 has a first portion 131 and a second portion 132 that can cause different refractive paths for beams. Further, the light source module 100 of this embodiment uses a driving element 140 to rotate or move the light refractive element 130. In this way, the first portion 131 and the second portion 132 can take turn to enter the transmission path of the beam L, thereby enabling the beam L to enter the first optical layer 122 and the second optical layer 123 through the light refractive element 130 at different times. Based on the above, the area of the first optical layer 122 and the area of the second optical layer 123 can be designed to match the spot size of the incident beam L, thereby effectively reducing the area of the first optical layer 122 and the second optical layer 123. Therefore, the light source module 100 of this embodiment can have the advantage of low cost.

Figure 6:
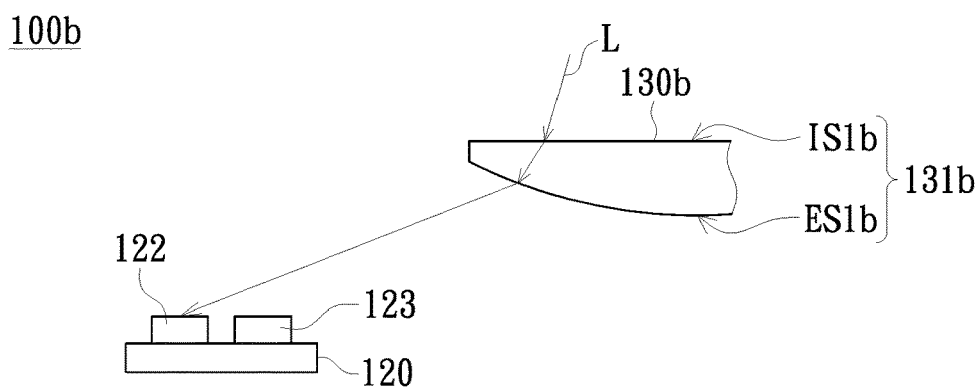
FIGS. 6 and 7 are schematic diagrams in which a light refractive element of a light source module refracts a beam according to another embodiment of the disclosure.
Figure 7:
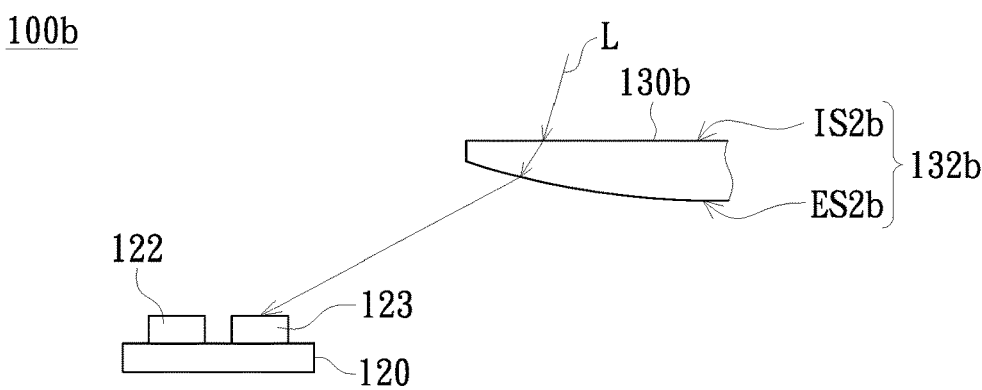

FIGS. 6 and 7 are schematic diagrams in which a light refractive element of a light source module refracts a beam according to another embodiment of the disclosure. The structure and advantages of the light source module 100b of this embodiment are similar to those of the embodiment of FIG. 1, and only the differences are explained below. Referring to FIGS. 6 and 7, the first light incoming surface IS1b of the first portion 131b of the light refractive element 130b is, for example, a planar surface, and the first light outgoing surface ES1b is a curved surface. The second light incoming surface IS2b of the second portion 132b is, for example, a planar surface, and the second light outgoing surface ES2b is a curved surface. The curvature of the first light outgoing surface ES1b is different from the curvature of the second light outgoing surface ES2b. Therefore, when the beam L passes through the light refractive element 130b, it can exit from the first portion 131b and the second portion 132b at different refractive angles. The first portion 131b of the light refractive element 130b can guide the beam L to enter the first optical layer 122 of the wavelength conversion element 120, and the second portion 132b can guide the beam L to enter the second optical layer 123. Incidentally, in this embodiment, the first light incoming surface IS1b and the second light incoming surface IS2b are parallel to each other, for example. It is understood that the first light outgoing surface ES1b and the second light outgoing surface ES2b of this embodiment are depicted as convex curved surfaces, but other embodiments are not limited thereto.

Figure 8:
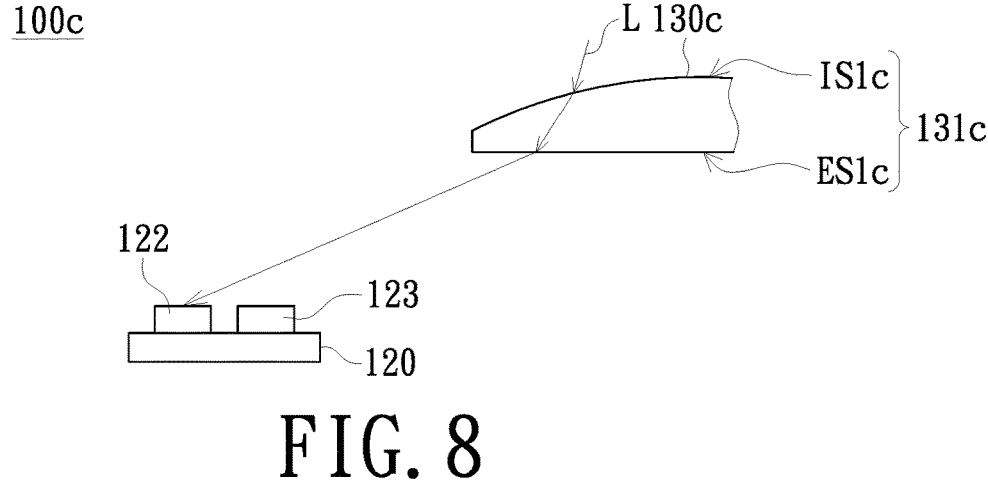
FIGS. 8 and 9 are schematic diagrams in which a light refractive element of a light source module refracts a beam according to another embodiment of the disclosure.
Figure 9:
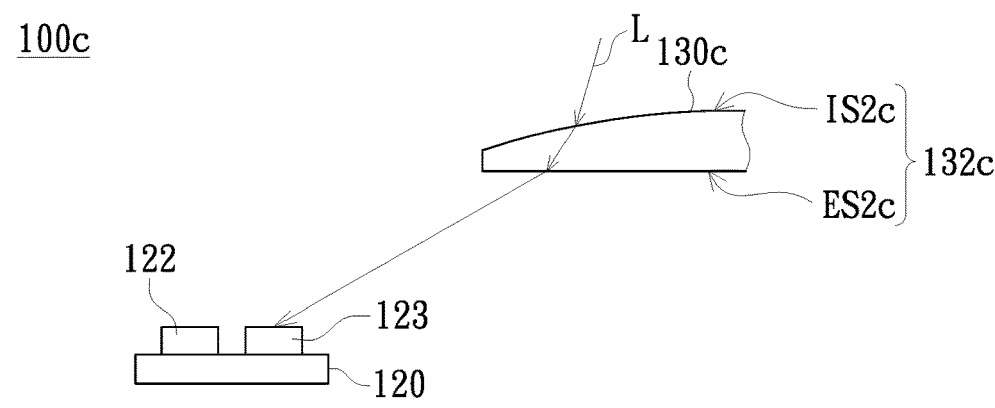

FIGS. 8 and 9 are schematic diagrams in which a light refractive element of a light source module refracts a beam according to another embodiment of the disclosure. The structure and advantages of the light source module 100c of this embodiment are similar to those of the embodiments of FIGS. 6 and 7, and only the differences are explained below. Referring to FIGS. 8 and 9, the first light incoming surface IS1c of the first portion 131c of the light refractive element 130c is, for example, a curved surface, and the first light outgoing surface ES1c is a planar surface. The second light incoming surface IS2c of the first portion 132c may be a curved surface, and the second light outgoing surface ES2c may be a planar surface. The curvature of the first light incoming surface IS1c is different from the curvature of the second light incoming surface IS2c. Therefore, when the beam L passes through the light refractive element 130c, it can exit from the first portion 131c and the second portion 132c at different refractive angles. The first portion 131c of the light refractive element 130c can guide the beam L to enter the first optical layer 122 of the wavelength conversion element 120, and the second portion 132c can guide the beam L to enter the second optical layer 123. Incidentally, in this embodiment, the first light outgoing surface ES1c and the second light outgoing surface ES2c are parallel to each other, for example. Similarly, the first light incoming surface IS1c and the second light incoming surface IS2c are not limited to the convex arc surface as depicted in the figure.

Figure 10:
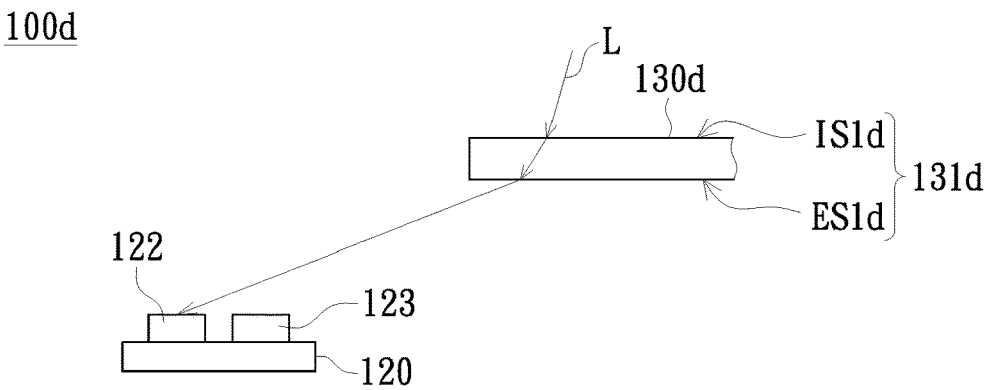
FIGS. 10 and 11 are schematic diagrams in which a light refractive element of a light source module refracts a beam according to another embodiment of the disclosure.
Figure 11:
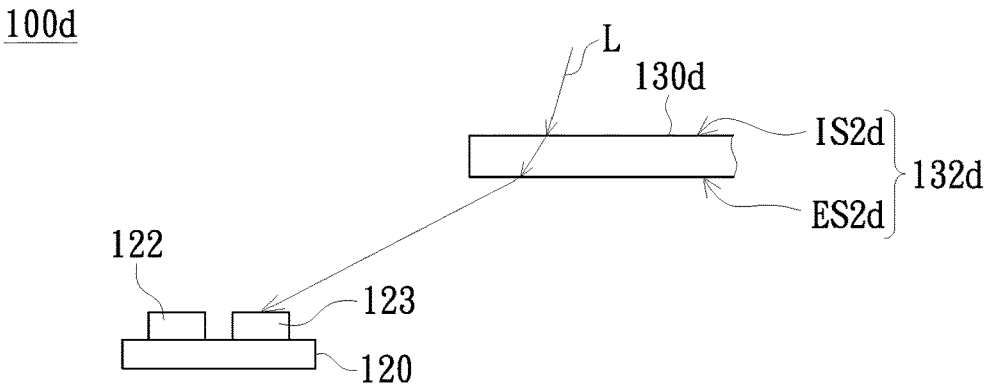

FIGS. 10 and 11 are schematic diagrams in which a light refractive element of a light source module refracts a beam according to another embodiment of the disclosure. The structure and advantages of the light source module 100d of this embodiment are similar to those of the embodiment of FIG. 1, and only the differences are explained below. Referring to FIGS. 10 and 11, the material of the first portion 131d of the light refractive element 130d and the material of the second portion 132d may have different refractive indices. In this way, when the beam L passes through the light refractive element 130d, it can exit from the first portion 131d and the second portion 132d at different refractive angles. The first portion 131d of the light refractive element 130d can guide the beam L to enter the first optical layer 122 of the wavelength conversion element 120, and the second portion 132*d* can guide the beam L to enter the second optical layer 123. In this embodiment, the material of the first portion 131*d* and the material of the second portion 132*d* can adopt glass with different compositions, but other embodiments are not limited thereto. In addition, in this embodiment, the first light incoming surface IS1*d*, the first light outgoing surface ES1*d*, the second light incoming surface IS2*d*, and the second light outgoing surface ES2*d* can all be planar surfaces; and the first light incoming surface IS1*d*, the first light outgoing surface ES1*d*, the second light incoming surface IS2*d*, and the second light outgoing surface ES2*d* are parallel to each other, for example. Further, the thickness of the first portion 131*d* and the thickness of the second portion 132*d* may be approximately the same, but the disclosure is not limited thereto.

Figure 12:
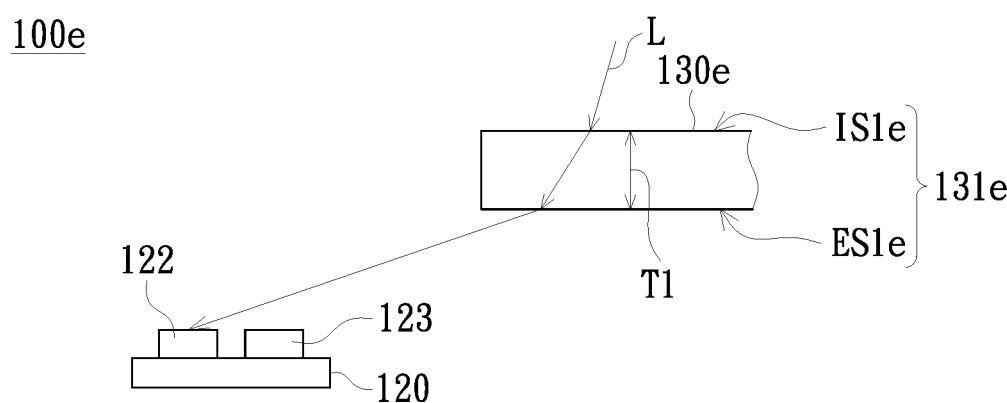
FIGS. 12 and 13 are schematic diagrams in which a light refractive element of a light source module refracts a beam according to another embodiment of the disclosure.
Figure 13:
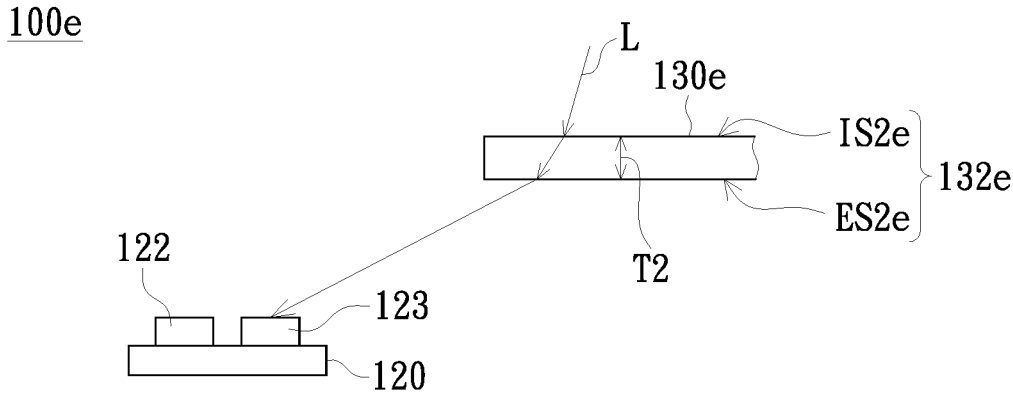

FIGS. 12 and 13 are schematic diagrams in which a light refractive element of a light source module refracts a beam according to another embodiment of the disclosure. The structure and advantages of the light source module 100*e* of this embodiment are similar to those of the embodiments of FIGS. 10 and 11, and only the differences are explained below. Referring to FIGS. 12 and 13, the first portion 131*e* and the second portion 132*e* of the light refractive element 130*e* are, for example, in a plate shape, and the first portion 131*e* and the second portion 132*e* have different thicknesses. For example, as shown in FIG. 12, the thickness T1 of the first portion 131*e* shown in FIG. 12 is different from the thickness T2 of the second portion 132*e* shown in FIG. 13. In this way, when the beam L passes through the light refractive element 130*e*, it can exit from the first portion 131*e* and the second portion 132*e* at different refractive angles. The first portion 131*e* of the light refractive element 130*e* can guide the beam L to enter the first optical layer 122 of the wavelength conversion element 120, and the second portion 132*e* can guide the beam L to enter the second optical layer 123. In detail, in this embodiment, the first light incoming surface IS1*e*, the first light outgoing surface ES1*e*, the second light incoming surface IS2*e*, and the second light outgoing surface ES2*e* can all be planar surfaces; and the first light incoming surface IS1*e*, the first light outgoing surface ES1*e*, the second light incoming surface IS2*e*, and the second light outgoing surface ES2*e* are parallel to each other, for example. Further, the thickness T1 of the first portion 131*e* can be the distance between the first light incoming surface IS1*e* and the first light outgoing surface ES1*e* (e.g., the distance along the axial direction), and the thickness T2 of the second portion 132*e* can be the distance between the second light incoming surface IS2*e* and the second light outgoing surface ES2*e* (e.g., the distance along the axial direction). Incidentally, the first portion 131*e* and the second portion 132*e* can use materials with the same refractive index, but the disclosure is not limited thereto.

Figure 14:
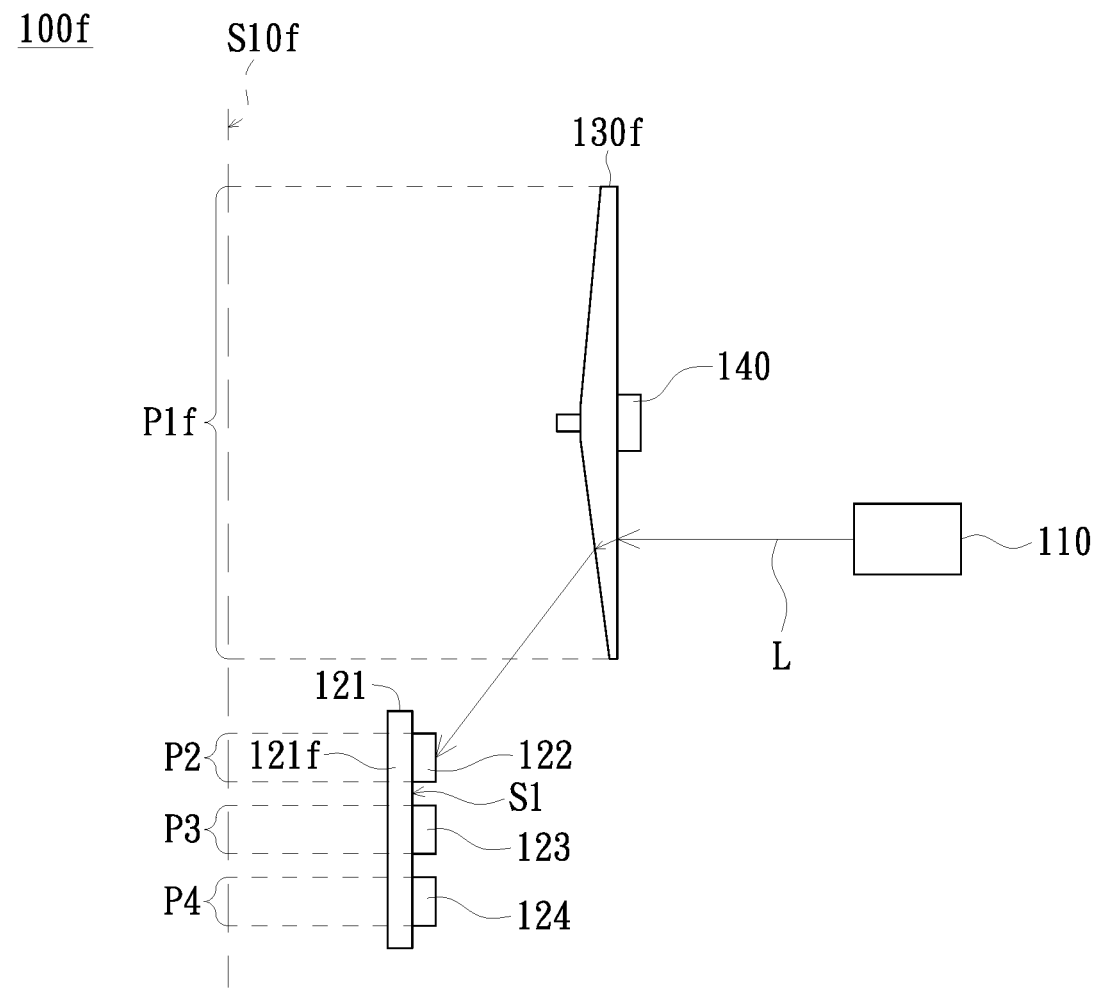
FIG. 14 is a schematic diagram of a light source module according to another embodiment of the disclosure.
Figure 15:
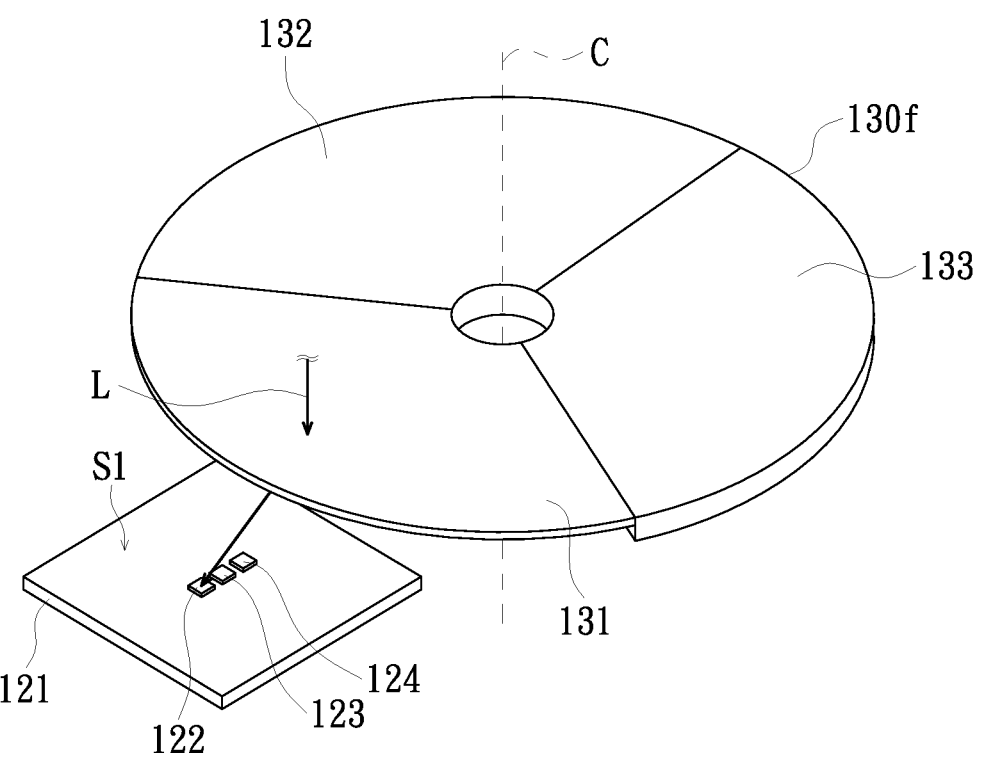
FIG. 15 is a schematic diagram in which the light refractive element of FIG. 14 refracts a beam

FIG. 14 is a schematic diagram of a light source module according to another embodiment of the disclosure. FIG. 15 is a schematic diagram in which the light refractive element of FIG. 14 refracts a beam. The structure and advantages of the light source module 100*f* of this embodiment are similar to those of the embodiment in FIG. 1, and only the differences are explained below. Referring to FIGS. 14 and 15, the wavelength conversion element 120*f* further includes, for example, a third optical layer 124 arranged on the substrate 121. Please continue to refer to FIG. 15. The light refractive element 130*f* further has, for example, a third portion 133 for refracting the beam L to the third optical layer 124 of the wavelength conversion element 120. The first portion 131, the second portion 132 and the third portion 133 take turns to enter the transmission path of the beam L when the light refractive element 130*f* is rotated about the central axis C.

In detail, similar to the first optical layer 122 and the second optical layer 123, the third optical layer 124 can generate a converted beam Lr with a wavelength different from that of the beam L after being irradiated by the beam L. For example, in this embodiment, the first optical layer 122, the second optical layer 123 and the third optical layer 124 may be wavelength conversion layers with different wavelength conversion materials, respectively. Further, in an embodiment, the first optical layer 122, the second optical layer 123 and the third optical layer 124 can emit green, yellow and red light respectively after being irradiated by a beam L (e.g., a blue laser), but the disclosure is not limited thereto. In addition, in another embodiment, the first optical layer 122 and the second optical layer 123 are respectively wavelength conversion layers with different wavelength conversion materials, for example, and the third optical layer 124 can be a reflective layer. For example, the first optical layer 122 and the second optical layer 123 can emit green and yellow light respectively after being irradiated by the beam L, and the third optical layer 124 (reflective layer) can directly reflect the beam L. It is understood that in this embodiment, because other features of the third optical layer 124 are the same as those of the first optical layer 122 and the second optical layer 123, no redundant detail is to be given herein.

Referring to FIGS. 14 and 15 again. Similarly, the first portion 131, the second portion 132 and the third portion 133 may be arranged adjacent to each other around the central axis C of the light refractive element 130*f*. The driving element 140 is configured to drive the light refractive element 130*f* to rotate so that the first portion 131, the second portion 132 and the third portion 133 take turns to enter the transmission path of the beam L. Specifically, the area ratio of the first portion 131, the second portion 132 and the third portion 133 to the light refractive element 130*f* can be set according to actual needs, so the disclosure does not impose any restrictions on this. Incidentally, in this embodiment, the first optical layer 122, the second optical layer 123 and the third optical layer 124 can be arranged on the first surface S1 of the substrate 121, and the light refractive element 130*f* can be parallel to the first surface S1. The third portion 133 of the light refractive element 130*f* may have a third light incoming surface IS3 and a third light outgoing surface ES3. The third light incoming surface IS3 and the third light outgoing surface ES3 are opposite to each other, the third light incoming surface IS3 may be closer to the light source device 110 than the third light outgoing surface ES3, and the first light incoming surface IS1, the second light incoming surface IS2 and the third light incoming surface IS3 may be parallel to the first surface S1. The reference plane S10*f* is, for example, a virtual plane parallel to the first surface S1 of the substrate 121. The orthogonal projection P1*f* of the light refractive element 130*f* on the reference plane S10*f* does not overlap the orthogonal projections P2, P3 and P4 of the first optical layer 122, the second optical layer 123 and the third optical layer 124 on the reference plane S10*f* to avoid affecting the path of the beams emitted from the first optical layer 122, the second optical layer 123 and the third optical layer 124. In detail, the orthogonal projection P1*f* of the light refractive element 130*f* on the reference plane S10*f* does not overlap the orthogonal projections P2, P3 and P4 of the first optical layer 122, the second optical layer 123 and the third optical layer 124 on the reference plane S10*f* during the rotation or movement of the light refractive element 130*f*.

Figure 16:
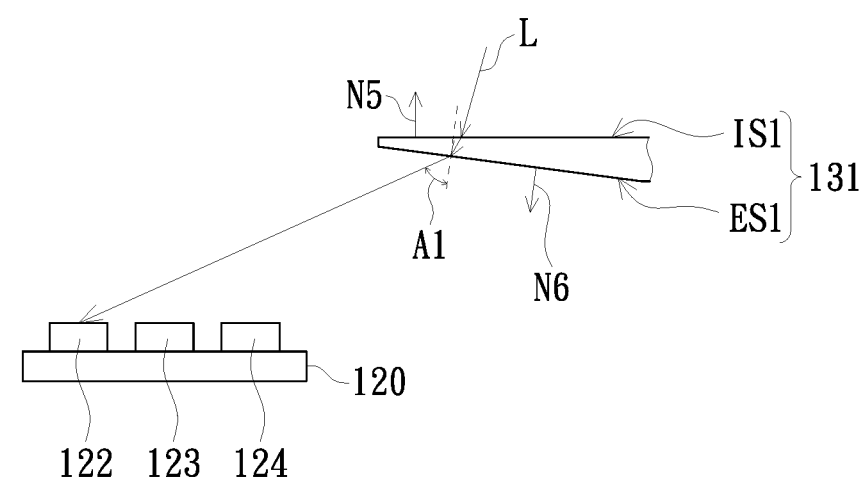
FIG. 16 is a schematic diagram in which the first portion of the light refractive element of FIG. 15 refracts a beam.
Figure 17:
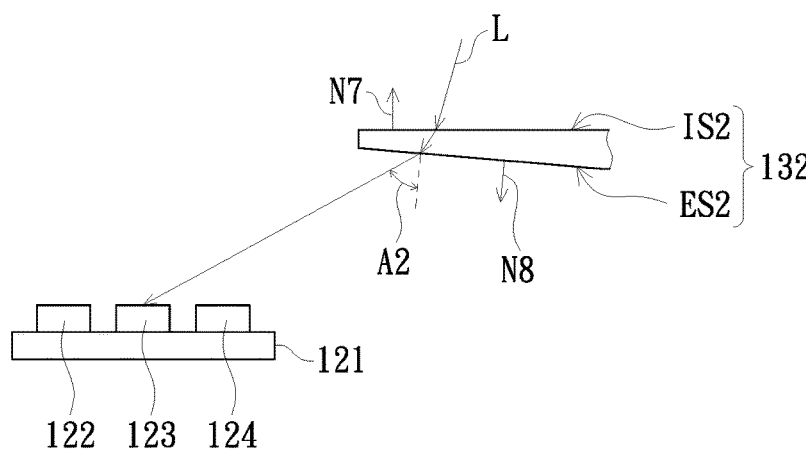
FIG. 17 is a schematic diagram in which the second portion of the light refractive element of FIG. 15 refracts a beam.
Figure 18:
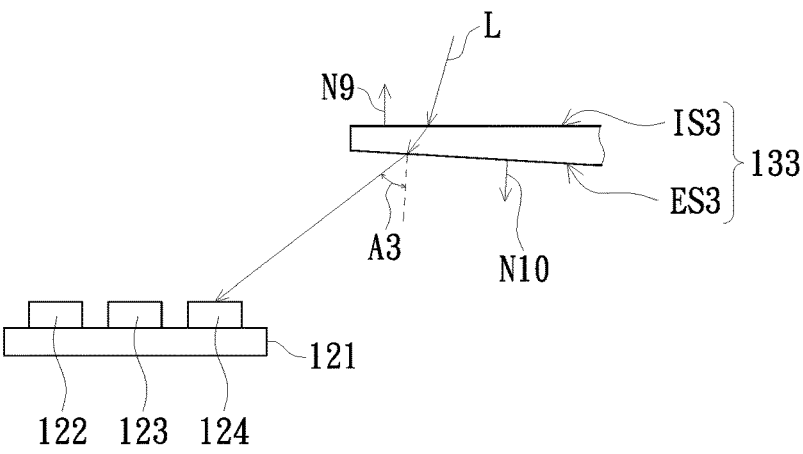
FIG. 18 is a schematic diagram in which the third portion of the light refractive element of FIG. 15 refracts a beam

FIG. 16 is a schematic diagram in which the first portion of the light refractive element of FIG. 15 refracts a beam. FIG. 17 is a schematic diagram in which the second portion of the light refractive element of FIG. 15 refracts a beam. FIG. 18 is a schematic diagram in which the third portion of the light refractive element of FIG. 15 refracts a beam. Referring to FIG. 16 first, similarly, the first portion 131 of the light refractive element 130$f$ may have a first light incoming surface IS1 and a first light outgoing surface ES1. The first light incoming surface IS1 and the first light outgoing surface ES1 are opposite to each other, and the beam L from the light source device 110 (shown in FIG. 14) enters the first portion 131 from the first light incoming surface IS1 and exits from the first light outgoing surface ES1 at a first refractive angle A1. On the other hand, as shown in FIG. 17, the second portion 132 of the light refractive element 130$f$ may have a second light incoming surface IS2 and a second light outgoing surface ES2. The second light incoming surface IS2 and the second light outgoing surface ES2 are opposite to each other, and the beam L from the light source device 110 (shown in FIG. 14) enters the second portion 132 from the second light incoming surface IS2 and exits from the second light outgoing surface ES2 at a second refractive angle A2. It should be noted that the features of the first portion 131 depicted in FIG. 16 are the same as those of the embodiment of FIG. 3 and the features of the second portion 132 depicted in FIG. 17 are the same as those of the embodiment of FIG. 4, no redundant detail is to be given herein. Referring to FIG. 18, the beam L from the light source device 110 (shown in FIG. 14) enters the third portion 133 from the third light incoming surface IS3 and exits from the third light outgoing surface ES3 at a third refractive angle A3. In this embodiment, the third refractive angle A3 is the included angle between the beam L emitted from the third light outgoing surface ES3 and the normal direction N10 of the third light outgoing surface ES3. The first refractive angle A1, the second refractive angle A2 and the third refractive angle A3 are different from each other (e.g., the first refractive angle A1 is different from the second refractive angle A2, the first refractive angle A1 is different from the third refractive angle A3, and the second refractive angle A2 is different from the third refractive angle A3), but the disclosure is not limited thereto. In short, the first portion 131, the second portion 132 and the third portion 133 can guide the beam L to different locations on the substrate 121, respectively.

Please refer to FIGS. 16, 17 and 18 together. For example, the first light incoming surface IS1 and the first light outgoing surface ES1 are, for example, planar surfaces. The second light incoming surface IS2 and the second light outgoing surface ES2 can be planar surfaces. The third light incoming surface IS3 and the third light outgoing surface ES3 can be planar surfaces. The slope of the first light outgoing surface ES1 relative to the first light incoming surface IS1, the slope of the second light outgoing surface ES2 relative to the second light incoming surface IS2 and the slope of the third light outgoing surface ES3 relative to the third light incoming surface IS3 are different from each other. Further, the first light incoming surface IS1, the second light incoming surface IS2 and the third light incoming surface IS3 are parallel to each other, for example. The included angle between the normal direction N5 of the first light incoming surface IS1 and the normal direction N6 of the first light outgoing surface ES1, the included angle between the normal direction N7 of the second light incoming surface IS2 and the normal direction N8 of the second light outgoing surface ES2 and the included angle between the normal direction N9 of the third light incoming surface IS3 and the normal direction N10 of the third light outgoing surface ES3 can be different from each other. In this way, the first portion 131, the second portion 132 and the third portion 133 can guide the beam L to enter the first optical layer 122, the second optical layer 123 and the third optical layer 124 at different times, respectively.

Figure 19:
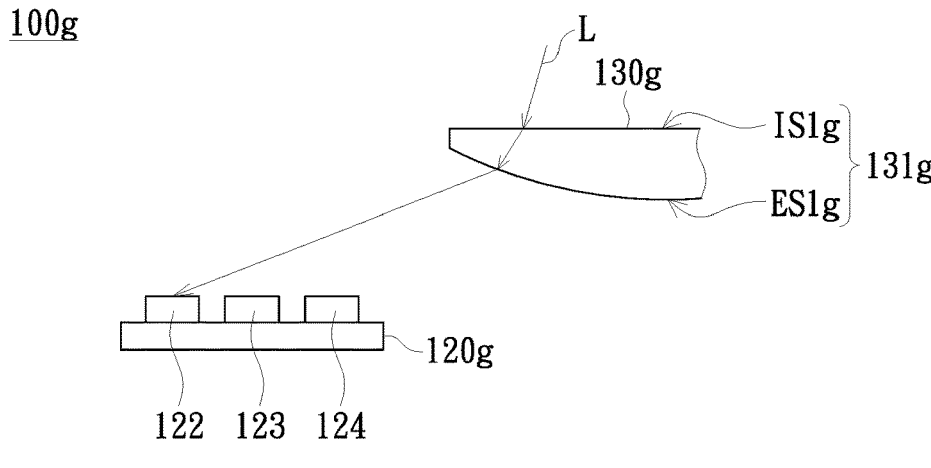
FIG. 19 is a schematic diagram in which a first portion of a light refractive element of a light source module refracts a beam according to another embodiment of the disclosure.
Figure 20:
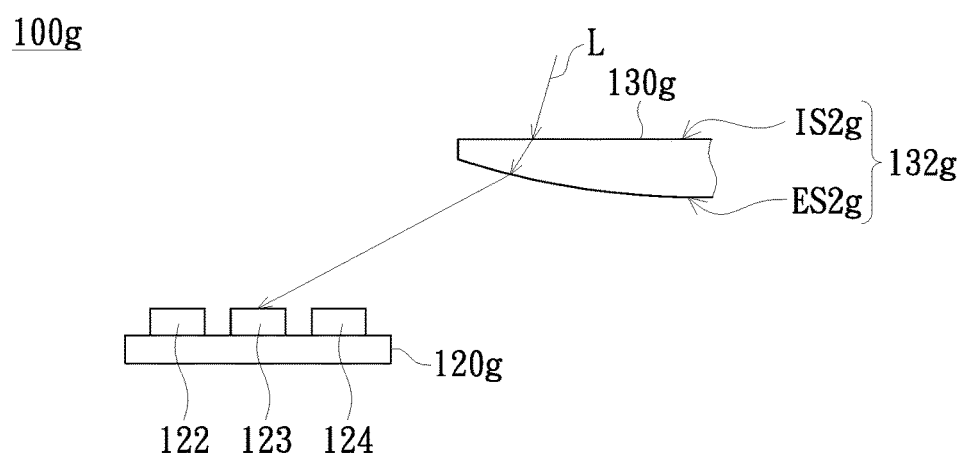
FIG. 20 is a schematic diagram in which a second portion of the light refractive element in FIG. 19 refracts a beam.
Figure 21:
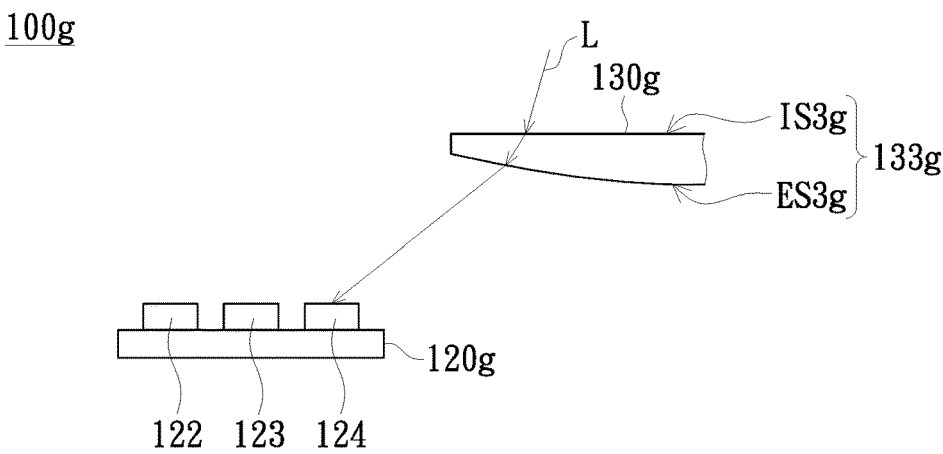
FIG. 21 is a schematic diagram in which a third portion of the light refractive element of FIG. 19 refracts a beam.

FIG. 19 is a schematic diagram in which a first portion of a light refractive element of a light source module refracts a beam according to another embodiment of the disclosure. FIG. 20 is a schematic diagram in which a second portion of the light refractive element in FIG. 19 refracts a beam. FIG. 21 is a schematic diagram in which a third portion of the light refractive element of FIG. 19 refracts a beam. The structure and advantages of the light source module 100$g$ of this embodiment are similar to those of the embodiments of FIGS. 6 and 7, and only the differences are explained below. Please refer to FIG. 19 first. The first light incoming surface IS1$g$ of the first portion 131$g$ of the light refractive element 130$g$ may be a planar surface, and the first light outgoing surface ES1$g$ may be a curved surface. Referring to FIG. 20, the second light incoming surface IS2$g$ of the second portion 132$g$ may be a planar surface, and the second light outgoing surface ES2$g$ may be a curved surface. It is understood that the features of the first portion 131$g$ depicted in FIG. 19 are the same as those of the embodiment of FIG. 6 and the features of the second portion 132$g$ depicted in FIG. 20 are the same as those of the embodiment of FIG. 7, and no redundant detail is to be given herein. Referring to FIG. 21, in the light refractive element 130$g$ of this embodiment, the third light incoming surface IS3$g$ of the third portion 133$g$ can be a planar surface, and the third light outgoing surface ES3$g$ can be a curved surface. Referring to FIGS. 19, 20, and 21 together, the curvatures of the first light outgoing surface ES1$g$, the second light outgoing surface ES2$g$ and the third light outgoing surface ES3$g$ are different from each other. In this way, when the beam L passes through the light refractive element 130$g$, it can be emitted from the first portion 131$g$, the second portion 132$g$ and the third portion 133$g$ at different refractive angles. Therefore, the first portion 131$g$, the second portion 132$g$, and the third portion 133$g$ can guide the beam L to enter the first optical layer 122, the second optical layer 123 and the third optical layer 124 of the wavelength conversion element 120$g$, respectively. In detail, the first light incoming surface IS1$g$, the second light incoming surface IS2$g$ and the third light incoming surface IS3$g$ are parallel to each other, for example. The curvature of the first light outgoing surface ES1$g$ can be greater than the curvature of the second light outgoing surface ES2$g$, and the curvature of the second light outgoing surface ES2$g$ can be greater than the curvature of the third light outgoing surface ES3$g$.

Figure 22:
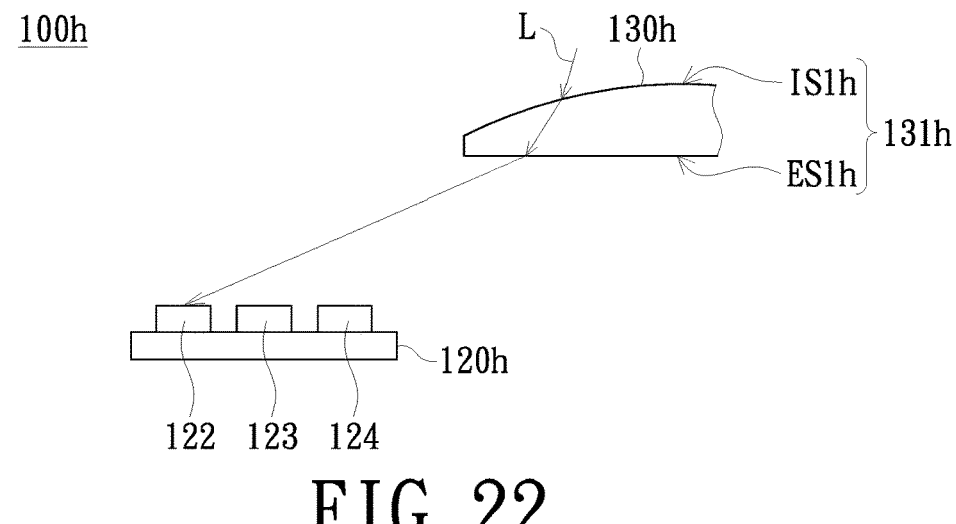
FIG. 22 is a schematic diagram in which a first portion of a light refractive element of a light source module refracts a beam according to another embodiment of the disclosure.
Figure 23:
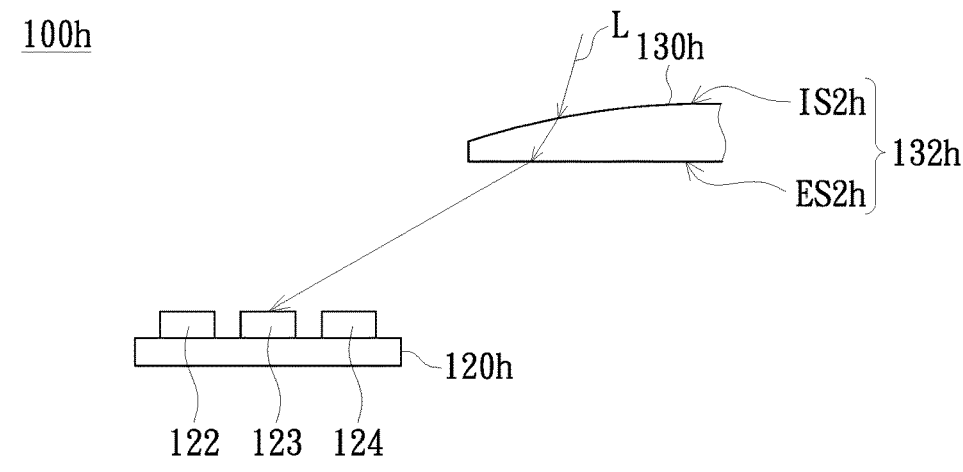
FIG. 23 is a schematic diagram in which a second portion of the light refractive element in FIG. 22 refracts a beam.
Figure 24:
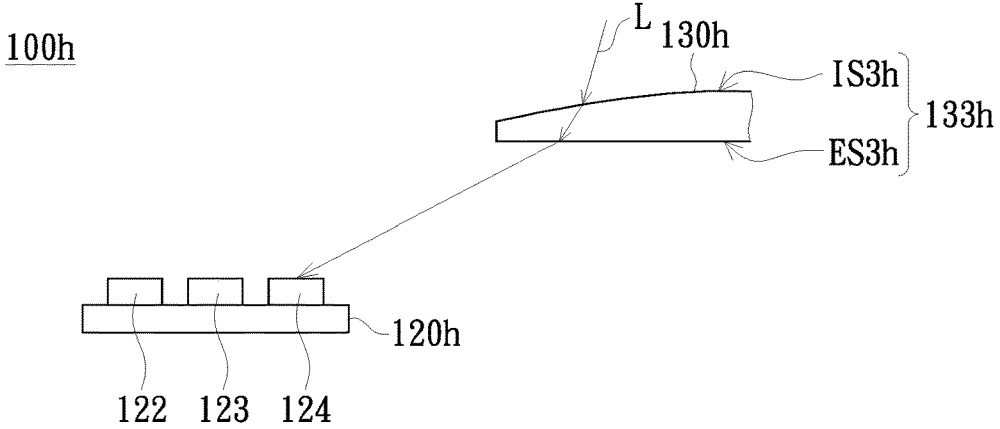
FIG. 24 is a schematic diagram in which a third portion of the light refractive element of FIG. 22 refracts a beam

FIG. 22 is a schematic diagram in which a first portion of a light refractive element of a light source module refracts a beam according to another embodiment of the disclosure. FIG. 23 is a schematic diagram in which a second portion of the light refractive element in FIG. 22 refracts a beam. FIG. 24 is a schematic diagram in which a third portion of the light refractive element of FIG. 22 refracts a beam. The structure and advantages of the light source module 100$h$ of this embodiment are similar to those of the embodiments of FIGS. 8 and 9, and only the differences are explained below. Please refer to FIG. 22 first. The first light incoming surface IS1$h$ of the first portion 131$h$ of the light refractive element 130$h$ may be a curved surface, and the first light outgoing surface ES1$h$ may be a planar surface. In addition, as shown in FIG. 23, the second light incoming surface IS2$h$ of the second portion 132*h* may be a curved surface, and the second light outgoing surface ES2*h* may be a planar surface. It is understood that the features of the first portion 131*h* depicted in FIG. 22 are the same as those of the embodiment of FIG. 8, and the features of the second portion 132*h* depicted in FIG. 23 are the same as those of the embodiment of FIG. 9, and no redundant detail is to be given herein. Referring to FIG. 24, in the light refractive element 130*h* of this embodiment, the third light incoming surface IS3*h* of the third portion 133*h* can be a curved surface, and the third light outgoing surface ES3*h* can be a planar surface. Referring to FIGS. 22, 23 and 24 together, the curvatures of the first light incoming surface IS1*h*, the second light incoming surface IS2*h* and the third light incoming surface IS3*h* are different from each other. In this way, when the beam L passes through the light refractive element 130*h*, it can exit from the first portion 131*h*, the second portion 132*h* and the third portion 133*h* at different refractive angles. The first portion 131*h*, the second portion 132*h* and the third portion 133*h* can guide the beam L to enter the first optical layer 122, the second optical layer 123 and the third optical layer 124 of the wavelength conversion element 120*h*, respectively. In detail, the first light outgoing surface ES1*h*, the second light outgoing surface ES2*h* and the third light outgoing surface ES3*h* are parallel to each other, for example. The curvature of the first light incoming surface IS1*h* can be greater than the curvature of the second light incoming surface IS2*h*, and the curvature of the second light incoming surface IS2*h* can be greater than the curvature of the third light incoming surface IS3*h*.

Figure 25:
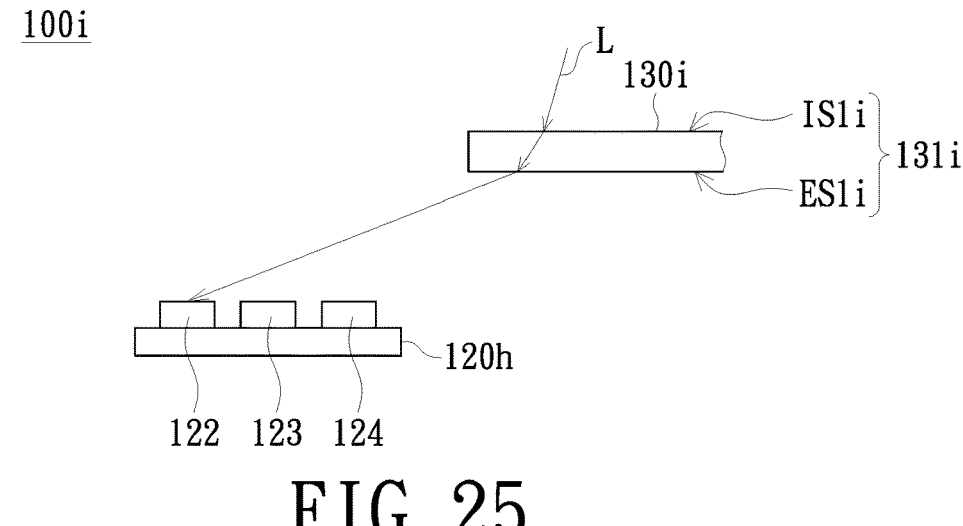
FIG. 25 is a schematic diagram in which a first portion of a light refractive element of a light source module refracts a beam according to another embodiment of the disclosure.
Figure 26:
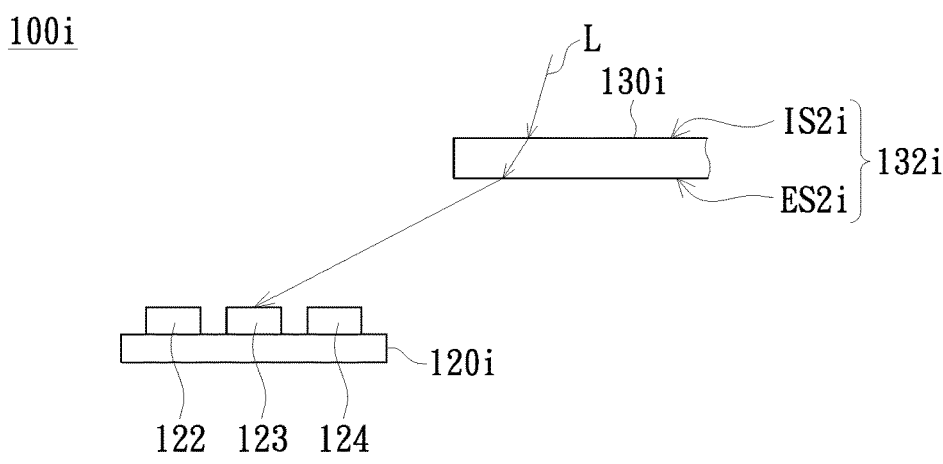
FIG. 26 is a schematic diagram in which a second portion of the light refractive element in FIG. 25 refracts a beam.
Figure 27:
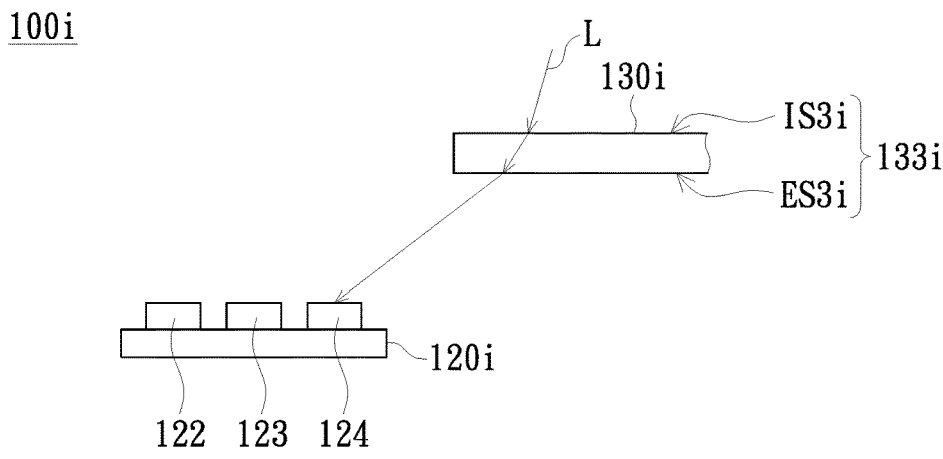
FIG. 27 is a schematic diagram in which a third portion of the light refractive element of FIG. 25 refracts a beam.

FIG. 25 is a schematic diagram in which a first portion of a light refractive element of a light source module refracts a beam according to another embodiment of the disclosure. FIG. 26 is a schematic diagram in which a second portion of the light refractive element in FIG. 25 refracts a beam. FIG. 27 is a schematic diagram in which a third portion of the light refractive element of FIG. 25 refracts a beam. The structure and advantages of the light source module 100*i* of this embodiment are similar to those of the embodiments of FIGS. 10 and 11, and only the differences are explained below. Referring to FIGS. 25, 26 and 27 together. In the light refractive element 130*i* of this embodiment, the material of the first portion 131*i*, the material of the second portion 132*i* and the material of the third portion 133*i* may have different refractive indices. In this way, when the beam L passes through the light refractive element 130*i*, it can exit from the first portion 131*i*, the second portion 132*i* and the third portion 133*i* at different refractive angles. The first portion 131*i*, the second portion 132*i* and the third portion 133*i* can guide the beam L to enter the first optical layer 122, the second optical layer 123 and the third optical layer 124 of the wavelength conversion element 120*i*, respectively. In this embodiment, the material of the first portion 131*i*, the material of the second portion 132*i* and the material of the third portion 133*i* can use glass with different compositions, but other embodiments are not limited thereto. In addition, in this embodiment, the first light incoming surface IS1*i*, the first light outgoing surface ES1*i*, the second light incoming surface IS2*i*, the second light outgoing surface ES2*i*, the third light incoming surface IS3*i* and the third light outgoing surface ES3*i* can all be planar surfaces, and the first light incoming surface IS1*i*, the first light outgoing surface ES1*i*, the second light incoming surface IS2*i*, the second light outgoing surface ES2*i*, the third light incoming surface IS3*i* and the third light outgoing surface ES3*i* are parallel to each other, for example. Further, the thickness of the first portion 131*i*, the thickness of the second portion 132*i* and the thickness of the third portion 133*i* may be approximately the same, but the disclosure is not limited thereto.

Figure 28:
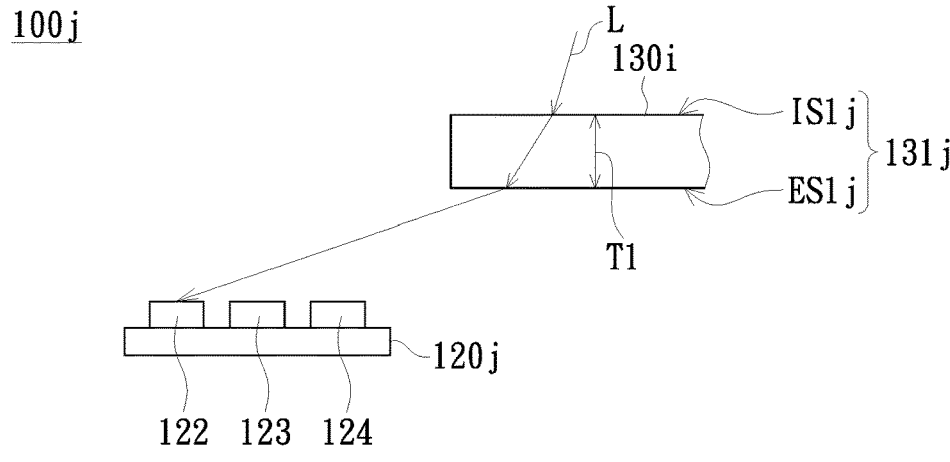
FIG. 28 is a schematic diagram in which a first portion of a light refractive element of a light source module refracts a beam according to another embodiment of the disclosure.
Figure 29:
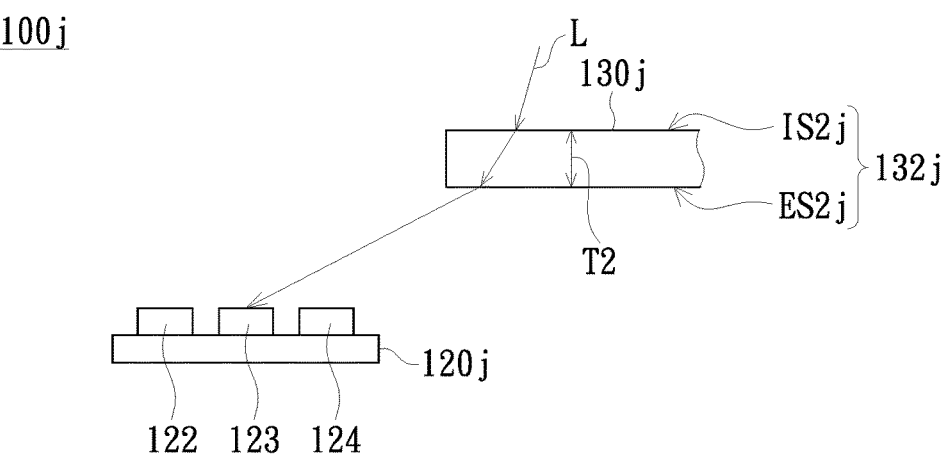
FIG. 29 is a schematic diagram in which a second portion of the light refractive element in FIG. 28 refracts a beam.
Figure 30:
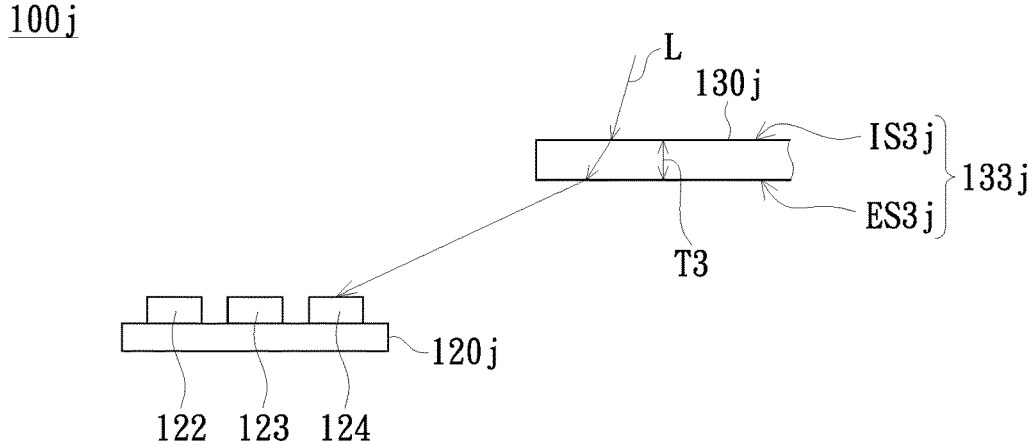
FIG. 30 is a schematic diagram in which a third portion of the light refractive element of FIG. 28 refracts a beam.

FIG. 28 is a schematic diagram in which a first portion of a light refractive element of a light source module refracts a beam according to another embodiment of the disclosure. FIG. 29 is a schematic diagram in which a second portion of the light refractive element in FIG. 28 refracts a beam. FIG. 30 is a schematic diagram in which a third portion of the light refractive element of FIG. 28 refracts a beam. The structure and advantages of the light source module 100*j* of this embodiment are similar to those of the embodiments of FIGS. 12 and 13, and only the differences are explained below. Please refer to FIGS. 28, 29 and 30 together. In the light refractive element 130*j* of this embodiment, the first portion 131*j*, the second portion 132*j* and the third portion 133*j* are, for example, in a plate shape, and the first portion 131*j*, the second portion 132*j* and the third portion 133*j* may have different thicknesses. In other words, the thickness T1 of the first portion 131*j*, the thickness T2 of the second portion 132*j* and the thickness T3 of the third portion 133*j* may be different from each other. In this way, when the beam L passes through the light refractive element 130*j*, it can exit from the first portion 131*j*, the second portion 132*j* and the third portion 13*j* at different refractive angles. The first portion 131*j*, the second portion 132*j* and the third portion 133*j* can guide the beam L to enter the first optical layer 122, the second optical layer 123 and the third optical layer 124 of the wavelength conversion element 120*j*, respectively. In detail, in this embodiment, the first light incoming surface IS1*j*, the first light outgoing surface ES1*j*, the second light incoming surface IS2*j*, the second light outgoing surface ES2*j*, the third light incoming surface IS3*j* and the third light outgoing surface ES3*j* can all be planar surfaces, and the first light incoming surface IS1*j*, the first light outgoing surface ES1*j*, the second light incoming surface IS2*j*, the second light outgoing surface ES2*j*, the third light incoming surface IS3*j* and the third light outgoing surface ES3*j* are parallel to each other, for example. Further, the thickness T1 of the first portion 131*j* may be the distance between the first light incoming surface IS1*j* and the first light outgoing surface ES1*j*, the thickness T2 of the second portion 132*j* may be the distance between the second light incoming surface IS2*j* and the second light outgoing surface ES2*j*, and the thickness T3 of the third portion 133*j* may be the distance between the third light incoming surface IS3*j* and the third light outgoing surface ES3*j*. Incidentally, the first portion 131*j*, the second portion 132*j* and the third portion 133*j* use materials with the same refractive index, for example, but the disclosure is not limited thereto.

Figure 31:
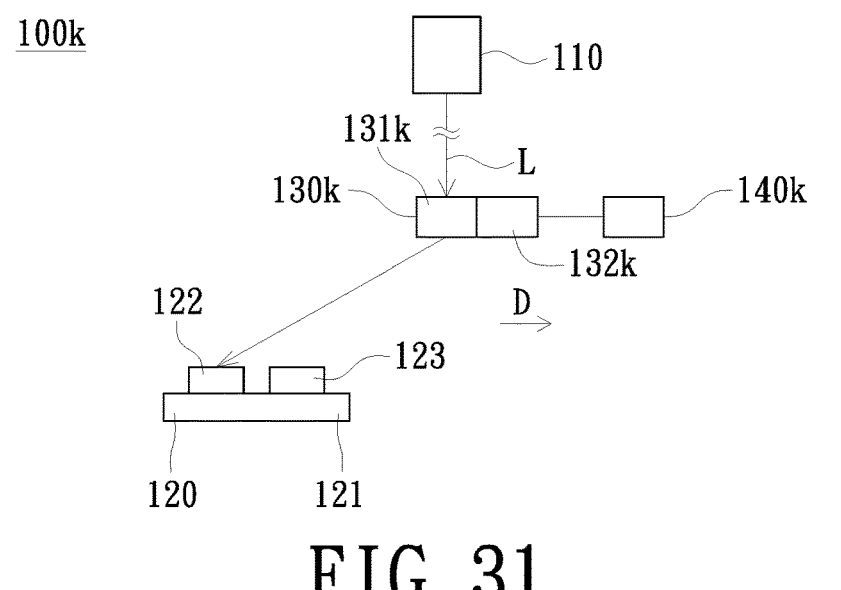
FIG. 31 is a schematic diagram of a light source module according to another embodiment of the disclosure.

FIG. 31 is a schematic diagram of a light source module according to another embodiment of the disclosure. The structure and advantages of the light source module 100*k* of this embodiment are similar to those of the embodiment in FIG. 1, and only the differences are explained below. Referring to FIG. 31, the driving element 140*k* can be configured to drive the light refractive element 130*k* to move back and forth in the direction D, and the first portion 131*k* and the second portion 132*k* are arranged adjacent to each other in the direction D. In this way, when the light refractive element 130*k* moves back and forth in the direction D, the beam L can take turn to enter the first portion 131*k* and the second portion 132*k* and then enter the first optical layer 122 or the second optical layer 123 of the wavelength conversion element 120. It should be noted that the first portion 131*k* and the second portion 132*k* of this embodiment use materials with different refractive indices, for example, to emit the beam L passing through the light refractive element 130*k* from the first portion 131k and the second portion 132k at different refractive angles, respectively, thereby guiding the beam L to incident at different locations on the substrate 121. However, the disclosure does not impose any restrictions on the specific structure of the light refractive element 130k.

Figure 32:
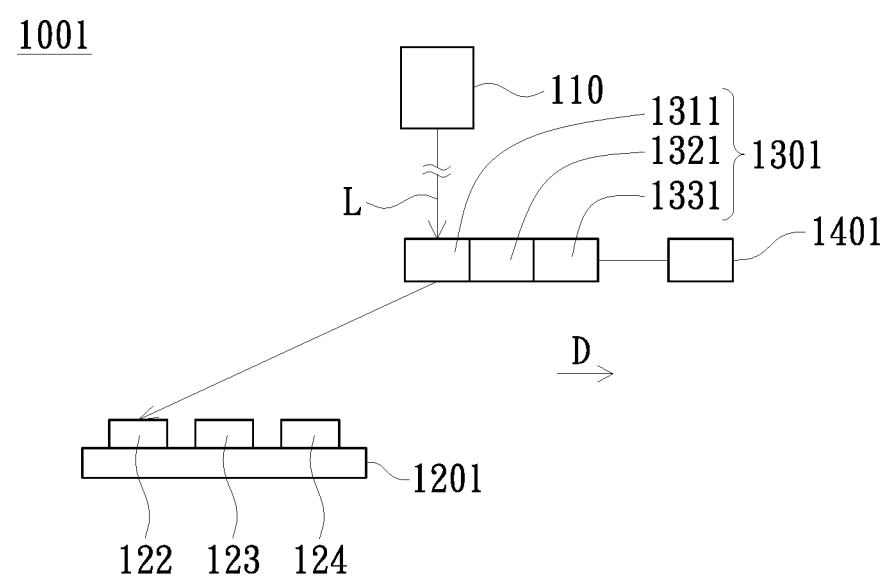
FIG. 32 is a schematic diagram of a light source module according to another embodiment of the disclosure.

FIG. 32 is a schematic diagram of a light source module according to another embodiment of the disclosure. The structure and advantages of the light source module 100l of this embodiment are similar to those of the embodiment in FIG. 31, and only the differences are explained below. Please refer to FIG. 32. Compared to the embodiment of FIG. 31, the wavelength conversion element 120l of this embodiment further includes, for example, a third optical layer 133, and the light refractive element 130l may further include a third portion 133l. The driving element 140l is configured to drive the light refractive element 130l to move back and forth in the direction D. The first portion 131l, the second portion 132l and the third portion 133l are arranged adjacent to each other in the direction D. In this way, when the light refractive element 130l moves back and forth in the direction D, the beam L can take turn to enter the first portion 131l, the second portion 132l and the third portion 133l and exit from the first portion 131l, the second portion 132l and the third portion 133l at different refractive angles, respectively, thereby correspondingly entering the first optical layer 122, the second optical layer 123 or the third optical layer 133. Similarly, in this embodiment, the first portion 131l, the second portion 132l and the third portion 133l can use materials with different refractive indices and have approximately the same thickness, but other embodiments are not limited thereto.

Figure 33:
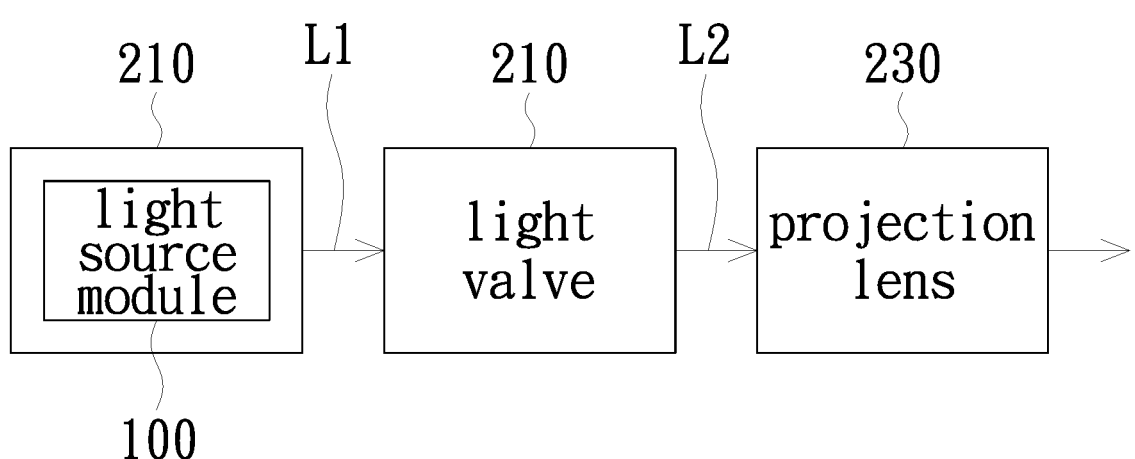
FIG. 33 is a block diagram of a projection device according to an embodiment of the disclosure.

FIG. 33 is a block diagram of a projection device according to an embodiment of the disclosure. Referring to FIG. 33, the projection device 200 includes an illumination system 210, a light valve 220 and a projection lens 230. The illumination system 210 is configured to provide an illumination beam L1. The light valve 220 is arranged on the transmission path of the illumination beam L1 to convert the illumination beam L1 into an image beam L2. The projection lens 230 is arranged on the transmission path of the image beam L2 to project the image beam L2 out of the projection device 200. The illumination system 210 includes a light source module 100. However, the illumination system 210 may include the aforementioned light source modules 100a, 100b, 100c, 100d, 100e, 100f, 100g, 100h, 100i, 100j, 100k or 100l in other embodiments. In this embodiment, at least one of the first optical layer 122 and the second optical layer 123 of the wavelength conversion element 120 is configured to convert the beam L into a converted beam Lr, and the illumination beam L1 includes the converted beam Lr.

Figure 34:
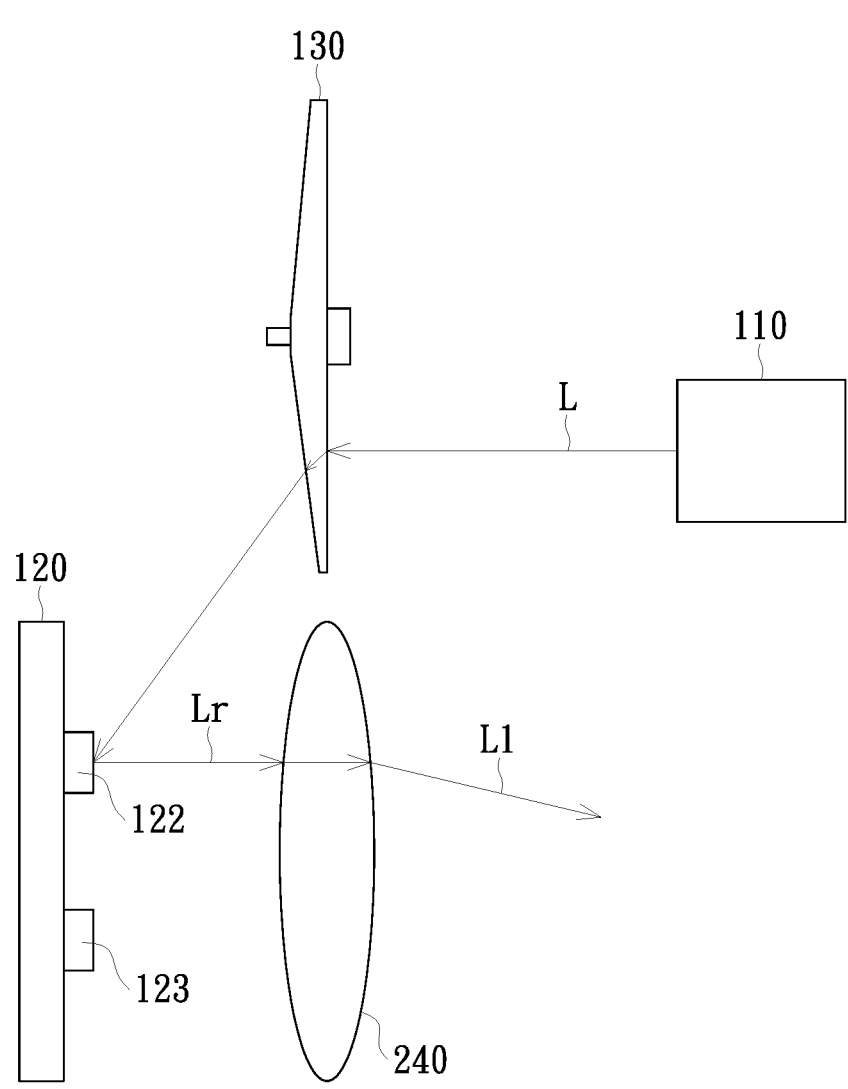
FIG. 34 is a schematic diagram of the illumination system in FIG. 33.

FIG. 34 is a schematic diagram of the illumination system in FIG. 33. Please refer to FIGS. 33 and 34 together. In detail, the first optical layer 122 and the second optical layer 123 of this embodiment are, for example, wavelength conversion layers with different wavelength conversion materials, so the first optical layer 122 and the second optical layer 123 can convert the beam L into a converted beam Lr with different wavelengths, respectively. In this case, the illumination beam L1 may include the converted beam Lr generated by the first optical layer 122 and the second optical layer 123. However, the first optical layer 122 may be a wavelength conversion layer and the second optical layer 123 may be a reflective layer in one embodiment; In this case, the illumination beam L1 may include at least one of the converted beam Lr generated by the first optical layer 122 and the beam L reflected by the second optical layer 123. It is understood that the wavelength conversion element 120 may further include a third optical layer in another embodiment. Further, the first optical layer 122, the second optical layer 123 and the aforementioned third optical layer can all be wavelength conversion layers, and the illumination beam L1 can include at least one or more of the converted beams Lr generated by the first optical layer 122, the second optical layer 123 and the aforementioned third optical layer. In an embodiment, the first optical layer 122 and the second optical layer 123 can be wavelength conversion layers, the aforementioned third optical layer can be a reflective layer, and the illumination beam L1 can include at least one of the converted beam Lr generated by the first optical layer 122 and the second optical layer 123 and the beam L reflected by the aforementioned third optical layer.

Please continue to refer to FIG. 34. In this embodiment, the illumination system 210 may further include a condenser lens 240. The condenser lens 240 is arranged opposite to the first optical layer 122 and the second optical layer 123. The condenser lens 240 is located on the transmission path of the converted beam Lr to converge the converted beam Lr, thereby transmitting the converted beam Lr to the subsequent optical elements. For example, the first optical layer 122 and the second optical layer 123 can be wavelength conversion layers, so the condenser lens 240 can be located on the transmission path of the converted beam Lr generated by the first optical layer 122 and the second optical layer 123. In one embodiment, the first optical layer 122 may be a wavelength conversion layer, and the second optical layer 123 may be a reflective layer. In this case, the condenser lens 240 may be located on the transmission path of the converted beam Lr generated by the first optical layer 122, but is not limited to whether the condenser lens 240 is located on the transmission path of the reflected beam L reflected by the second optical layer 123. It is understood that in an embodiment where the wavelength conversion element 120 further includes a third optical layer, the condenser lens 240 can be located on the transmission path of the converted beam Lr generated by the first optical layer 122 and the second optical layer 123 when the first optical layer 122 and the second optical layer 123 are wavelength conversion layers and the third optical layer is a reflective layer. Similarly, the condenser lens 240 can be located on the transmission path of the converted beam Lr generated by the first optical layer 122, the second optical layer 123 and the aforementioned third optical layer when the first optical layer 122, the second optical layer 123 and the aforementioned third optical layer are all wavelength conversion layers. Incidentally, the condenser lens 240 of this embodiment is depicted as a biconvex lens, but the disclosure is not limited thereto.

Figure 35:
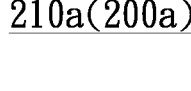
FIG. 35 is a schematic diagram of an illumination system of a projection device according to another embodiment of the disclosure.
Figure 35:
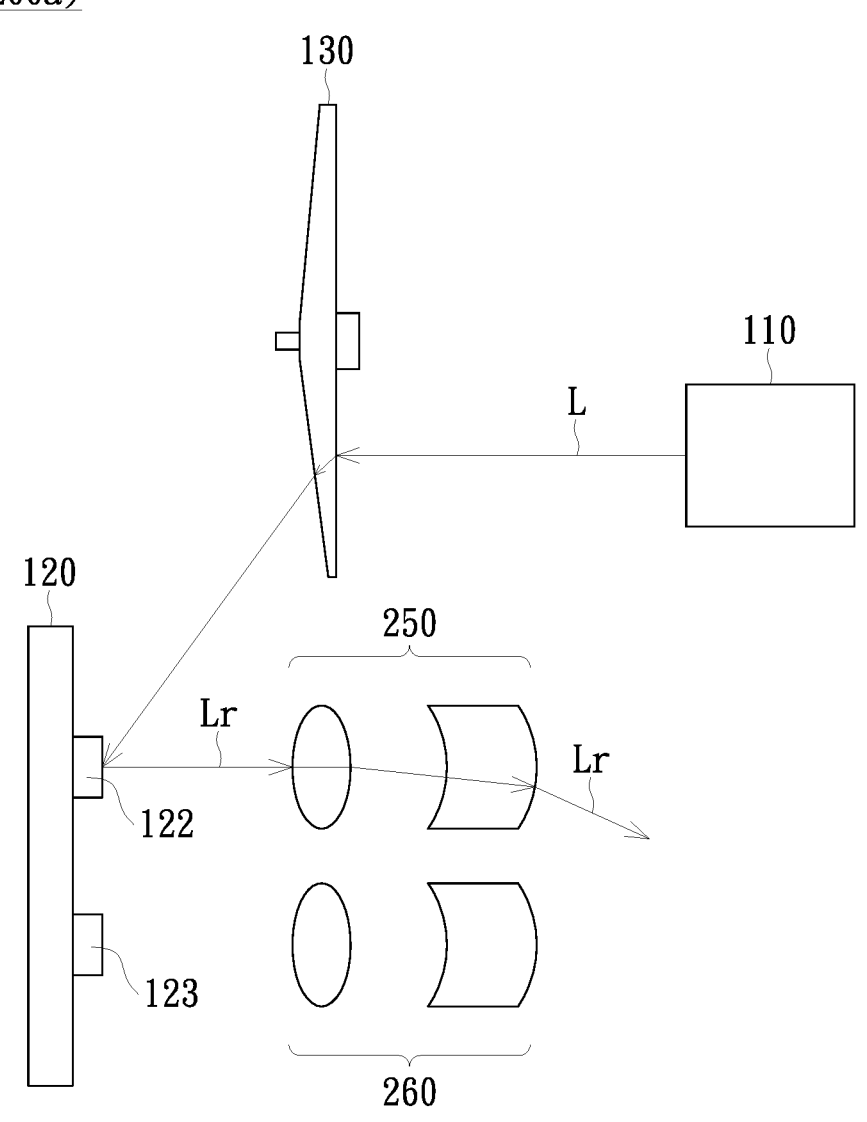

It is understood that the illumination system 210 is not limited to converging the converted beam Lr with a condenser lens in other embodiments. For example, referring to the projection device 200a of FIG. 35, the illumination system 210a may further include a first condensing element 250 and a second condensing element 260. The first condensing element 250 and the first optical layer 122 are arranged correspondingly, and the second condensing element 260 and the second optical layer 123 are arranged correspondingly. In this way, the first condensing element 250 can independently converge the converted beam Lr generated by the first optical layer 122, and the second condensing element 260 can independently converge the converted beam Lr generated by the second optical layer 123, thereby effectively reducing the spot of the converted beam Lr. For example, in this embodiment, the first condensing element 250 includes a biconvex lens and a concave convex lens, wherein the biconvex lens is closer to the first optical layer 122 than the concave convex lens. The features of the second condensing element 260 are substantially the same as those of the first condensing element 250. However, the disclosure does not limit the specific features of the first condensing element 250 and the second condensing element 260. Incidentally, in embodiments where the wavelength conversion element 120 further includes a third optical layer, the illumination system 210 may further have a third condensing element (not shown), and the third condensing element may be arranged corresponding to the third optical layer. The features of the third condensing element are substantially the same as those of the first condensing element 250 and the second condensing element 260, and no redundant detail is to be given herein.

Refer to FIG. 33 again. The light valve 220 is, for example, a digital micromirror device (DMD), a liquid crystal on silicon (LCOS) or a liquid crystal display (LCD), but the disclosure is not limited thereto. In addition, the disclosure does not limit the quantity of the light valves 220. For example, the projection device 200 of this embodiment can adopt a single-chip liquid crystal display panel or a three-chip liquid crystal display panel structure, but the disclosure is not limited thereto.

The projection lens 230 includes, for example, a combination of one or more optical lenses with refractive power, such as various combinations of non-planar lenses such as biconcave lenses, biconvex lenses, concave convex lenses, convex convex lenses and planar concave lenses. On the other hand, the projection lens 230 may also include planar optical lenses. The disclosure does not limit the type and configuration of the projection lens 230.

Compared to the conventional technology, the projection device 200 of this embodiment uses the aforementioned light source module 100, and therefore having the advantage of low cost.

In summary, the light source module of the disclosure adopts a light refractive element, and the light refractive element has a first portion and a second portion that can make the beam have different light refractive paths. Further, the light source module of the disclosure uses a driving element to drive the light refractive element to rotate or move, so that the first and second portions can take turn to enter the transmission path of the beam, thereby allowing the beam to take turn to enter the first and second optical layers through the light refractive element. Based on the above, the area of the first optical layer and the area of the second optical layer can be designed to match the spot size of the incident beam, thereby effectively reducing the area of the first and second optical layers. Therefore, the light source module of the disclosure can have the advantage of low cost. The projection device of the disclosure adopts the aforementioned light source module, so it can have the advantage of low cost. In addition, due to that the wavelength conversion element is a non-moving component, a heat dissipation device with a larger volume or area can be provided, which can achieve better heat dissipation effects for the wavelength conversion element.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "The disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims. Furthermore, the terms such as the first optical layer, the second optical layer, the first portion, the second portion, the first light incoming surface, the second light incoming surface, the first light outgoing surface, the second light outgoing surface, the first refractive angle, the second refractive angle, the first surface and the second surface are only used for distinguishing various elements and do not limit the number of the elements.

What is claimed is:

1. A light source module, comprising a light source device, a wavelength conversion element, a light refractive element and a driving element, wherein:

the light source device is configured to provide a beam;

the wavelength conversion element comprises a substrate, a first optical layer and a second optical layer, and the first optical layer and the second optical layer are arranged on the substrate;

the light refractive element is arranged between the light source device and the wavelength conversion element and is located on a transmission path of the beam, the light refractive element has a first portion and a second portion, the first portion is configured to refract the beam to the first optical layer, and the second portion is configured to refract the beam to the second optical layer; and the driving element is connected to the light refractive element and is configured to drive the light refractive element to move or rotate, so that the first portion and the second portion take turn to enter the transmission path of the beam.

2. The light source module according to claim 1, wherein:

the first portion has a first light incoming surface and a first light outgoing surface, the first light incoming surface and the first light outgoing surface are opposite to each other, and the beam enters the first portion from the first light incoming surface and exits from the first light outgoing surface at a first refractive angle;

the second portion has a second light incoming surface and a second light outgoing surface, the second light incoming surface and the second light outgoing surface are opposite to each other, and the beam enters the second portion from the second light incoming surface and exits from the second light outgoing surface at a second refractive angle.

3. The light source module according to claim 1, wherein the first light incoming surface and the first light outgoing surface are planar surfaces, the second light incoming surface and the second light outgoing surface are planar surfaces, a slope of the first light outgoing surface relative to the first light incoming surface is different from a slope of the second light outgoing surface relative to the second light incoming surface.

4. The light source module according to claim 1, wherein:
the first light incoming surface is a planar surface, and the first light outgoing surface is a curved surface;
the second light incoming surface is a planar surface, and the second light outgoing surface is a curved surface;
wherein a curvature of the first light outgoing surface is different from a curvature of the second light outgoing surface.

5. The light source module according to claim 1, wherein:
the first light incoming surface is a curved surface, and the first light outgoing surface is a planar surface;
the second light incoming surface is a curved surface, and the second light outgoing surface is a planar surface;
wherein a curvature of the first light incoming surface is different from a curvature of the second light incoming surface.

6. The light source module according to claim 1, wherein a material of the first portion and a material of the second portion have different refractive indices; or the first portion and the second portion are in a plate shape, and the first portion and the second portion have different thicknesses.

7. The light source module according to claim 1, wherein the wavelength conversion element is a non-moving component.

8. The light source module according to claim 1, wherein the light refractive element has a circular shape and a central axis, the first portion and the second portion are arranged adjacent to each other around the central axis of the light refractive element, and the driving element is configured to drive the light refractive element to rotate.

9. The light source module according to claim 1, wherein the driving element is configured to drive the light refractive element to move back and forth in a direction, and the first portion and the second portion are arranged in the direction.

10. The light source module according to claim 1, wherein the first optical layer is a wavelength conversion layer, and the second optical layer is another wavelength conversion layer or a reflective layer.

11. The light source module according to claim 1, wherein the first optical layer and the second optical layer are arranged on the first surface of the substrate, an orthogonal projection of the light refractive element on a reference plane does not overlap an orthogonal projection of the first optical layer and the second optical layer on the reference plane, and the reference plane is parallel to the first surface.

12. The light source module according to claim 1, wherein the substrate has a first surface and a second surface opposite to each other, the first optical layer and the second optical layer are arranged on the first surface, the second surface is provided with a plurality of heat dissipation fins, or the second surface is connected to a heat dissipation device.

13. The light source module according to claim 1, wherein the wavelength conversion element further comprises a third optical layer arranged on the substrate, the light refractive element further has a third portion configured to refract the beam to the third optical layer, wherein the first portion, the second portion and the third portion take turn to be located on the transmission path of the beam.

14. The light source module according to claim 13, wherein:
the first portion has a first light incoming surface and a first light outgoing surface, the first light incoming surface and the first light outgoing surface are opposite to each other, and the beam enters the first portion from the first light incoming surface and exits from the first light outgoing surface at a first refractive angle;
the second portion has a second light incoming surface and a second light outgoing surface, the second light incoming surface and the second light outgoing surface are opposite to each other, and the beam enters the second portion from the second light incoming surface and exits from the second light outgoing surface at a second refractive angle;
the third portion has a third light incoming surface and a third light outgoing surface, the third light incoming surface and the third light outgoing surface are opposite to each other, and the beam enters the third portion from the third light incoming surface and exits from the third light outgoing surface at a third refractive angle.

15. The light source module according to claim 13, wherein the first light incoming surface and the first light outgoing surface are planar surfaces, the second light incoming surface and the second light outgoing surface are planar surfaces, the third light incoming surface and the third light outgoing surface are planar surfaces, and a slope of the first light outgoing surface relative to the first light incoming surface, a slope of the second light outgoing surface relative to the second light incoming surface and a slope of the third light outgoing surface relative to the third light incoming surface are different from each other.

16. The light source module according to claim 13, wherein:
the first light incoming surface is a planar surface, and the first light outgoing surface is a curved surface;
the second light incoming surface is a planar surface, and the second light outgoing surface is a curved surface;
the third light outgoing surface is a planar surface, and the third light outgoing surface is a curved surface;
wherein curvatures of the first light outgoing surface, the second light outgoing surface and the third light outgoing surface are different from each other.

17. The light source module according to claim 13, wherein:
the first light incoming surface is a curved surface, and the first light outgoing surface is a planar surface;
the second light incoming surface is a curved surface, and the second light outgoing surface is a planar surface;
the third light incoming surface is a curved surface, and the third light outgoing surface is a planar surface;
wherein curvatures of the first light incoming surface, the second light incoming surface and the third light incoming surface are different from each other.

18. The light source module according to claim 13, wherein a material of the first portion, a material of the second portion and a material of the third portion have different refractive indices; or the first portion, the second portion and the third portion are in a plate shape, and the first portion, the second portion and the third portion have different thicknesses.

19. The light source module according to claim 13, wherein the light refractive element has a circular shape and a central axis, the first portion, the second portion and the third portion are arranged adjacent to each other around the central axis of the light refractive element, and the driving element is configured to drive the light refractive element to rotate.

20. The light source module according to claim 13, wherein the driving element is configured to drive the light refractive element to move back and forth in a direction, and the first portion, the second portion and the third portion are arranged in the direction.

21. The light source module according to claim 13, wherein the first optical layer and the second optical layer are wavelength conversion layers, and the third optical layer is another wavelength conversion layer or a reflective layer.

22. The light source module according to claim 13, wherein the first optical layer, the second optical layer and the third optical layer are arranged on the first surface of the substrate, an orthogonal projection of the light refractive element on a reference plane does not overlap an orthogonal projections of the first optical layer, the second optical layer and the third optical layer on the reference plane, and the reference plane is parallel to the first surface.

23. A projection device, comprising an illumination system, a light valve and a projection lens, the illumination system being configured to provide an illumination beam, the light valve being arranged on a transmission path of the illumination beam to convert the illumination beam into an image beam, the projection lens being arranged on a transmission path of the image beam to project the image beam out of the projection device, wherein the illumination system comprises a light source module, the light source module comprises a light source device, a wavelength conversion element, a light refractive element and a driving element, wherein:

the light source device is configured to provide a beam;
the wavelength conversion element comprises a substrate, a first optical layer and a second optical layer, and the first optical layer and the second optical layer are arranged on the substrate;
the light refractive element is arranged between the light source device and the wavelength conversion element and is located on a transmission path of the beam, the light refractive element has a first portion and a second portion, the first portion is configured to refract the beam to the first optical layer, and the second portion is configured to refract the beam to the second optical layer, wherein at least one of the first optical layer and the second optical layer is configured to convert the beam into a converted beam, and the illumination beam comprises the converted beam; and
the driving element is connected to the light refractive element and is configured to drive the light refractive element to move or rotate, so that the first portion and the second portion take turn to enter the transmission path of the beam.

24. The projection device according to claim 23, wherein the wavelength conversion element is a non-moving component.

25. The projection device according to claim 23, wherein the illumination system further comprises a condenser lens arranged corresponding to the first optical layer and the second optical layer, and the condenser lens is located on a transmission path of the converted beam.

26. The projection device according to claim 23, wherein the illumination system further comprises a first condensing element and a second condensing element, the first condensing element and the first optical layer are arranged correspondingly, and the second condensing element and the second optical layer are arranged correspondingly.

* * * * *